(12) United States Patent
Yoshizawa et al.

(10) Patent No.: US 11,895,641 B2
(45) Date of Patent: Feb. 6, 2024

(54) CONTROL APPARATUS, CONTROL METHOD, AND CONTROL PROGRAM

(71) Applicant: Nippon Telegraph and Telephone Corporation, Tokyo (JP)

(72) Inventors: Kento Yoshizawa, Musashino (JP); Ryo Miyatake, Musashino (JP); Yusuke Asai, Musashino (JP); Daisei Uchida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 117 days.

(21) Appl. No.: 17/623,685

(22) PCT Filed: Jul. 1, 2019

(86) PCT No.: PCT/JP2019/026146
§ 371 (c)(1),
(2) Date: Dec. 29, 2021

(87) PCT Pub. No.: WO2021/001895
PCT Pub. Date: Jan. 7, 2021

(65) Prior Publication Data
US 2022/0279530 A1 Sep. 1, 2022

(51) Int. Cl.
*H04W 72/12* (2023.01)
*H04W 88/16* (2009.01)

(52) U.S. Cl.
CPC ........ *H04W 72/1215* (2013.01); *H04W 88/16* (2013.01)

(58) Field of Classification Search
None
See application file for complete search history.

(56) References Cited

U.S. PATENT DOCUMENTS

2017/0013556 A1* 1/2017 Tanaka .................. H04W 16/14
2019/0281527 A1* 9/2019 Kuwahara ............. H04W 40/16

FOREIGN PATENT DOCUMENTS

| JP | 2017017555 | 1/2017 |
| JP | 2018157265 | 10/2018 |
| WO | WO 2015129242 | 9/2015 |

* cited by examiner

Primary Examiner — Hong Shao
(74) Attorney, Agent, or Firm — Fish & Richardson P.C.

(57) ABSTRACT

A control device of the present invention is for provision in a gateway device that includes multiple communication units that perform wireless communication with terminal devices using different communication methods. Based on communication unit individual information that is acquired from the communication units and includes information indicating at least characteristics of the communication methods of the communication units, operations of the communication units are scheduled so as to prevent the overlapping of periods in which the communication units perform signal transmission/reception with the terminal devices.

16 Claims, 22 Drawing Sheets

| | FIRST EMBODIMENT | SECOND AND THIRD EMBODIMENTS | FOURTH TO SIXTH EMBODIMENTS |
|---|---|---|---|
| GW-CONTROLLED METHOD + GW-CONTROLLED METHOD | ○ | ○ | ○ |
| TERMINAL-CONTROLLED METHOD WITH CHARACTERISTIC COMMUNICATION SEQUENCE + GW-CONTROLLED METHOD | × | ○ | ○ |
| TERMINAL-CONTROLLED METHOD WITH CHARACTERISTIC COMMUNICATION SEQUENCE + TERMINAL-CONTROLLED METHOD | × | ○ | ○ DOWNLINK ONLY |

CONTROL APPARATUS, CONTROL METHOD, AND CONTROL PROGRAM

CROSS-REFERENCE TO RELATED APPLICATIONS

This application is a National Stage application under 35 U.S.C. § 371 of International Application No. PCT/JP2019/026146, having an International Filing Date of Jul. 1, 2019. The disclosure of the prior application is considered part of the disclosure of this application, and is incorporated in its entirety into this application.

TECHNICAL FIELD

The present invention relates to a control device, a control method, and a control program for controlling multiple communication units that have different communication methods.

BACKGROUND ART

In recent years, remarkable progress has been made in markets related the IoT (Internet of Things). Active study is underway on technologies related to a broad range of fields from sensing and communication technologies to software applications. Multi-terminal connectivity is known as a desired feature in communication for IoT. In the world of IoT where many things are connected to the Internet, there is a need for a communication method that enables the simultaneous connection of a large number of devices.

Compared with conventional mobile communication, such communication for IoT is characteristic in that, for example, communication is performed much less frequently, and the communication capacity required for each unit is small. LPWA (Low Power Wide Area) has been attracting attention as a communication method that meets these needs. LPWA can reduce power consumption, expand coverage, and realize multiple access communication.

Also, various methods such as LoRaWAN, Wi-SUN, EnOcean, SIGFOX, and Wi-Fi HaLow have been established as specific communication methods that use a license-free band (see PTL 1, for example). Such LPWA methods use the same frequency band and realize communication compliant with their own communication protocols.

Due to growing demand for IoT communication and the diversification of requirements in the future, it is expected that new LPWA systems and wireless systems will be proposed. In order for IoT services that use LPWA to continue for a long period of time, it is necessary to realize a flexible LPWA shared GW (Gateway) that can support various old and new methods while also suppressing operation and maintenance costs.

CITATION LIST

Patent Literature

[PTL 1] Japanese Patent Application Publication No. 2017-17555

SUMMARY OF THE INVENTION

Technical Problem

In LPWA communication, the communication protocol differs depending on the method, and there is a mixture of methods in which control is performed by the GW and methods in which control is performed by the terminal. However, in most cases, chips that perform wireless signal processing are designed to operate with one communication method as appropriate, and it is not envisioned that different communication methods will exist in the same space at the same time.

For example, suppose that as shown in FIG. 25 a shared gateway device 100 that supports multiple LPWA methods is created by combining LPWA wireless chips 110-1, 110-2, and 110-3, each of which is guaranteed to operate using a single method.

Each of the LPWA wireless chips 110-1, 110-2, and 110-3 can perform communication using a single communication method, or can perform communication using any of the LPWA communication methods by changing a parameter or the like. If each of the LPWA wireless chips 110-1, 110-2, and 110-3 operates independently, and the transmission/reception timings are different from each other, communication will be performed using the same number of communication methods as the number of chips, that is to say using three communication methods. When using such LPWA wireless chips 110-1, 110-2, and 110-3 that use multiple communication methods, problems such as the following occur.

For example, assume that the LPWA wireless chip 110-1 supports communication method #1 and the LPWA wireless chip 110-2 supports communication method #2. At this time, as shown in FIG. 26A, there is a problem that if the LPWA wireless chip 110-1 starts transmitting data while the LPWA wireless chip 110-2 is waiting for reception, and then the LPWA wireless chip 110-2 attempts to receive data, interference occurs and reception fails.

Also, as shown in FIG. 26B, if the LPWA wireless chip 110-2 intermittently transmits data while the LPWA wireless chip 110-1 is also transmitting data intermittently, interference occurs. In this case, there is a problem that the transmission performed by both of the LPWA wireless chips 110-1 and 110-2 fails.

In other words, there is a problem that when multiple communication methods are used together, if multiple communication methods are used in parallel, collisions occur with transmission timings, and interference occurs between transmission waves and reception waves, thus causing a deterioration in communication characteristics.

In view of the above circumstances, an object of the present invention is to provide a technique capable of suppressing deterioration in communication characteristics when multiple communication methods are used in parallel.

Means for Solving the Problem

One aspect of the present invention is a control device for provision in a gateway device that includes a plurality of communication units that perform wireless communication with a terminal device using different communication methods, wherein based on communication unit individual information that is acquired from the communication units and includes information indicating at least a characteristic of the communication method of each of the communication units, operations of the communication units are scheduled so as to prevent overlapping of periods in which the communication units perform signal transmission/reception with the terminal device.

Another aspect of the present invention is the above control device, wherein each of the communication units is a gateway-controlled communication unit according to which the terminal device starts transmission of a data signal in response to reception of a transmission permission signal transmitted by the communication unit, and the control device includes a transmission timing adjustment unit configured to, based on the communication unit individual information, adjust timings of transmission of the transmission permission signal by the gateway-controlled communication units so as to prevent overlapping of periods in which the gateway-controlled communication units perform signal transmission/reception with the terminal device.

Another aspect of the present invention is the above control device, including: an unallocated period detection unit configured to detect, based on the communication unit individual information, an unallocated period in which none of the communication units perform signal transmission/reception; and an allocation unit configured to allocate any one of the communication units to the unallocated period detected by the unallocated period detection unit to allow the one communication unit to perform signal transmission/reception.

Another aspect of the present invention is the above control device, wherein, based on the communication unit individual information, the unallocated period detection unit detects a stop period in which all of the communication units have stopped signal transmission/reception as the unallocated period, and the allocation unit allocates any one of the communication units to the stop period detected by the unallocated period detection unit to allow the one communication unit to perform signal transmission/reception.

Another aspect of the present invention is the above control device, wherein in a case where signal transmission/reception is performed by any one of the communication methods that was allocated to a time frame, based on the communication unit individual information, the unallocated period detection unit detects a free state period as the unallocated period, the free state period being a free state in which the signal transmission/reception is not performed in the time frame, and the allocation unit allocates a communication unit corresponding to another communication method to the free state period detected by the unallocated period detection unit to allow the communication unit corresponding to another communication method to perform signal transmission/reception.

Another aspect of the present invention is the above control device, including: an occupied period detection unit configured to, in a case where one of the communication units performs signal transmission/reception with the terminal device, detect an occupied period that occurs due to the signal transmission/reception, based on the communication unit individual information that corresponds to the one communication unit; and a stop unit configured to, during the occupied period detected by the occupied period detection unit, stop signal transmission performed by a communication unit other than the communication unit that corresponds to the occupied period.

Another aspect of the present invention is the above control device, wherein the stop unit includes a request determination unit configured to determine whether or not a free state detection request regarding a wireless channel was made by a communication unit that is not performing signal transmission/reception with the terminal device in the occupied period, and a virtual response unit configured to, if the request determination unit determined that the free state detection request was made, transmit a response indicating that the wireless channel is in a blocked state to the communication unit that made the free state detection request.

Another aspect of the present invention is the above control device, wherein at least one of the communication units is a gateway-controlled communication unit according to which the terminal device starts transmission of a data signal in response to reception of a transmission permission signal transmitted by the communication unit, and another communication unit that is different from the gateway-controlled communication unit is a terminal-controlled communication unit according to which the terminal device performs data signal transmission at an arbitrary timing, and the stop unit includes a transmission stop unit configured to, during the occupied period, stop transmission of the transmission permission signal to the terminal device by a gateway-controlled communication unit that is different from the communication unit that corresponds to the occupied period, or stop data signal transmission to the terminal device by a communication unit different from the communication unit that corresponds to the occupied period.

Another aspect of the present invention is a control method for controlling a plurality of communication units included in a gateway device, the plurality of communication units being configured to perform wireless communication with a terminal device using different communication methods, wherein based on communication unit individual information that is acquired from the communication units and includes information indicating at least a characteristic of the communication method of each of the communication units, operations of the communication units are scheduled so as to prevent overlapping of periods in which the communication units perform signal transmission/reception with the terminal device.

Another aspect of the present invention is a program for causing a computer to function as the above-described control device.

Effects of the Invention

According to the present invention, deterioration in communication characteristics can be suppressed when multiple communication methods are used in parallel.

DESCRIPTION OF EMBODIMENTS (Basic Embodiment)

Figure 1:
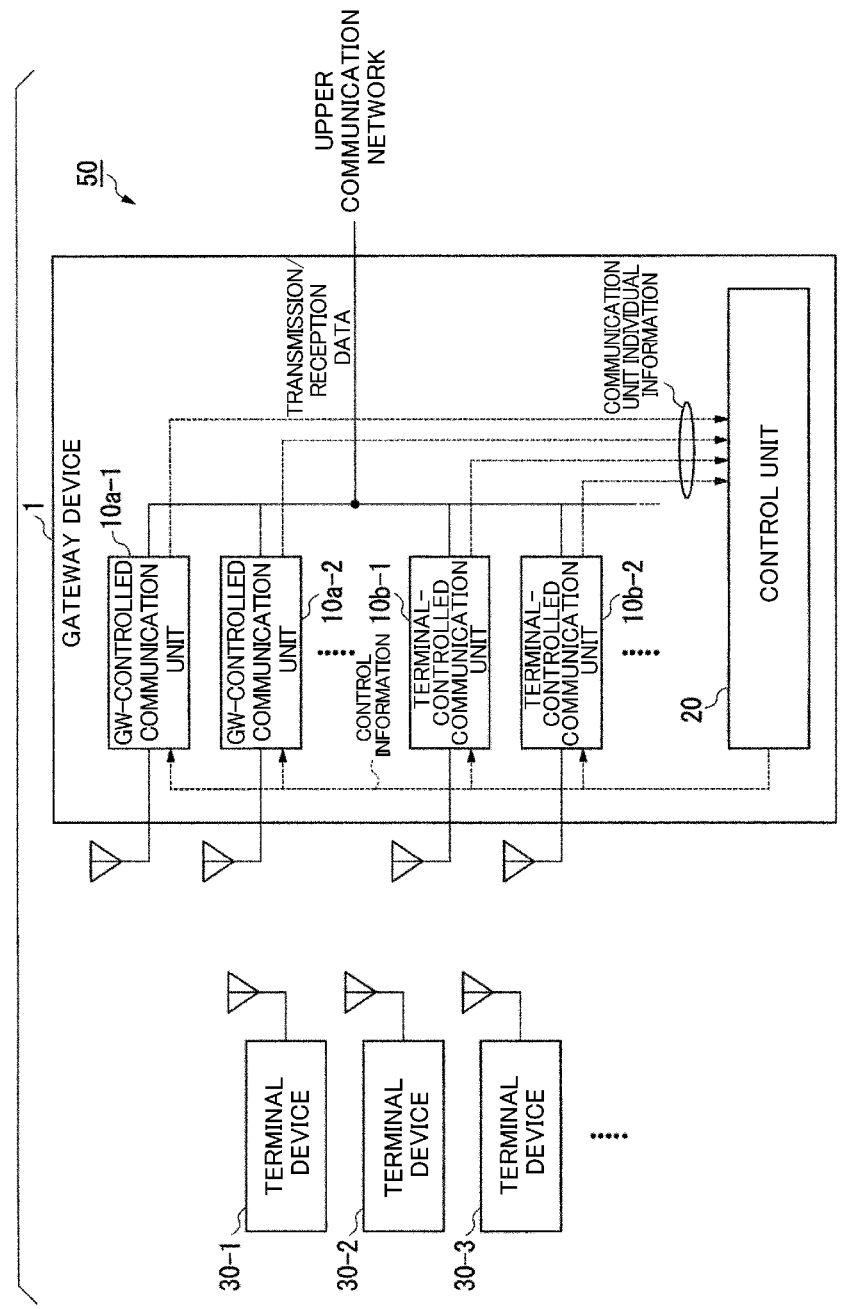
FIG. 1 is a block diagram showing a configuration of a wireless communication system according to a basic embodiment.

Hereinafter, embodiments of the present invention will be described with reference to the drawings. FIG. 1 is a block diagram showing the configuration of a wireless communication system 50 according to a basic embodiment of the present invention. The wireless communication system 50 includes multiple terminal devices 30 (30-1, 30-2, etc.) and a gateway device 1. Each of the terminal devices 30-1, 30-2, etc. wirelessly transmits and receives signals to and from the gateway device 1 using any one of various LPWA communication methods.

The signals that are transmitted and received include data signals for transmission, request signals (REQ (Request) signals), response signals (ACK (Acknowledgement) signals), beacon signals, and the like. A request signal is a signal that requests the transmission of a data signal. A response signal is a signal indicating that the reception of a data signal is complete. A beacon signal is a transmission permission signal indicating that data signal transmission is permitted.

The gateway device 1 is a relay device that connects to an upper communication network such as the Internet. The gateway device 1 includes GW-controlled communication units 10a-1, 10a-2, etc., terminal-controlled communication units 10b-1, 10b-2, etc., and a control unit 20.

In the following description, the term "GW-controlled communication unit 10a" is used when not particularly distinguishing between the GW-controlled communication units 10a-1, 10a-2, etc. The term "terminal-controlled communication unit 10b" is used when not particularly distinguishing between the terminal-controlled communication units 10b-1, 10b-2, etc. The term "communication unit 10" is used when not particularly distinguishing between the GW-controlled communication units 10a-1, 10a-2, etc. and the terminal-controlled communication units 10b-1, 10b-2, etc.

In FIG. 1, multiple GW-controlled communication units 10a-1, 10a-2, etc. and multiple terminal-controlled communication units 10b-1, 10b-2, etc. are shown, but it is sufficient that the gateway device 1 includes a plurality of either one. For example, the gateway device 1 may be provided with two GW-controlled communication units 10a-1 and 10a-2, may be provided with two terminal-controlled communication units 10b-1 and 10b-2, or may be provided with one GW-controlled communication unit 10a-1 and one terminal-controlled communication unit 10b-1.

Each of the GW-controlled communication units 10a performs wireless communication using a GW-controlled LPWA communication method. Here, the GW-controlled method is a method in which the gateway device 1 side can determine the timing of data signal transmission (hereinafter referred to as "data transmission") when a data signal is transmitted in an uplink direction from the terminal device 30-1, 30-2, or the like toward the gateway device 1, and when a data signal is transmitted in a downlink direction from the gateway device 1 to the terminal device 30-1, 30-2, or the like.

In the GW-controlled method, data transmission is performed using a procedure such as RIT (Receiver Initiated Transmission), which is one type of MAC (Media Access Control) protocol. For the downlink direction, the GW-controlled communication unit 10a performs data transmission at a desired timing. For the uplink direction, the GW-controlled communication unit 10a determines the timing of data transmission using a beacon signal. Specifically, the GW-controlled communication unit 10a transmits a beacon signal to the terminal devices 30-1, 30-2, etc., and the terminal devices 30-1, 30-2, etc. start to perform uplink data transmission in response to reception of the beacon signal.

Examples of GW-controlled LPWA communication methods include wide area seven, LoRa seven, LoRaWAN (Class-B) downlink, and FSK (Frequency Shift Keying) water supply. FSK water supply is a communication method applied to IoT water supply infrastructure such as smart meters for water supply and water leakage detection systems. A method other than the RIT method may be applied as the MAC protocol in these communication methods. For example, "seven" is a MAC protocol different from RIT and is disclosed in PTL 1.

Each of the terminal-controlled communication units 10b performs wireless communication using a terminal-controlled LPWA communication method. Here, a terminal-controlled method is a method in which the gateway device 1 does not have control when data is transmitted in the uplink direction, and the terminal devices 30-1, 30-2, etc. start data transmission at an arbitrary timing. Regarding data transmission in the downlink direction, the terminal-controlled communication unit 10b performs data transmission at an arbitrary timing as in a GW-controlled method. In a terminal-controlled method, data transmission is performed through a procedure such as ALOHA, which is one type of MAC protocol.

Examples of terminal-controlled LPWA communication methods include LoRaWAN (Class-A), LoRaWAN (Class-B) uplink direction, EnOcean, EnOcean LR (Long Range), SIGFOX, Wi-SUN, and Wi-Fi HaLow. In these communication methods, a method other than ALOHA may be applied as the MAC protocol.

Each of the communication units 10 is a functional unit constituted by a wireless chip. Each of the communication units 10 may be a wireless chip dedicated to a single communication method. Also, a configuration is possible in which a parameter of a wireless chip that has multiple communication methods is changed such that the wireless chip becomes a communication unit 10 that has any one communication method. Also, multiple communication units 10 may exist on one wireless chip.

Each of the communication units 10 transmits and receives signals to and from the terminal devices 30-1, 30-2, etc. by any one LPWA communication method. Each of the communication units 10 transmits data received from the terminal devices 30-1, 30-2, etc. to a server device or the like that is connected to an upper communication network. Also, each of the communication units 10 receives data transmitted by a server device or the like that is connected to an upper communication network, and transmits the received data to the terminal devices 30-1, 30-2, etc.

The control unit 20 is connected to the communication units 10 by control lines shown by dashed line sin FIG. 1. The control unit 20 acquires information from each of the communication units 10 and outputs control information for controlling the communication units 10. Information acquired by the control unit 20 from each of the communication units 10 will be referred to as communication unit individual information.

The communication unit individual information includes information indicating characteristics of the communication methods, such as information indicating the type of communication method, information on the MAC layer, information indicating the timing of the communication method, and information on the communication time. Here, the communication time information is, for example, a communication time counter according to the Radio Law Regulations, and is information such as a maximum continuous communication time and a minimum stoppage period. The communication unit individual information also includes notification information for notifying that communication of a specific type of communication method has started or ended, for example.

The control unit 20 extracts a feature amount of each communication method of the communication units 10 based on the communication unit individual information. Based on the extracted feature amounts, the control unit 20 schedules operations of the communication units 10 so as to prevent the overlapping of periods in which the communication units 10 transmit and receive signals to and from the terminal devices 30-1, 30-2, etc. The control unit 20 generates control information according to the scheduling result, and controls the start and stop of transmission by the communication units 10 based on the generated control information.

Here, an example of a feature amount extracted by the control unit 20 will be described with reference to FIGS. 2 to 5.

(Example of Feature Amount (Pattern 1: Timing Adjustment))

Figure 2:
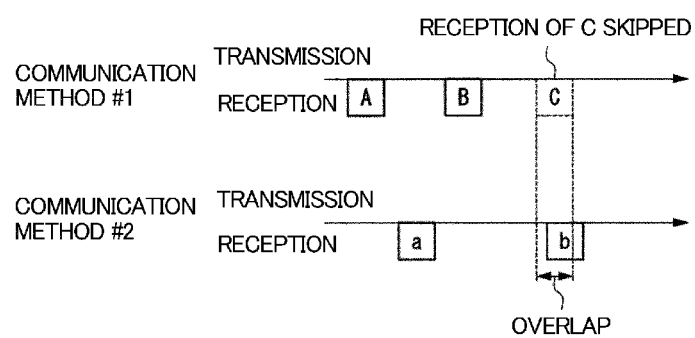
FIG. 2 is a diagram showing an example (pattern 1) of a feature amount in the above embodiment.

For example, in FIG. 2, the communication method #1 and the communication method #2 are GW-controlled methods. Also, assume that the control unit 20 has acquired the reception intervals of data A, data B, and data B of the communication method #1, and the reception intervals of data a and data b of the communication method #2 from the communication unit individual information. The control unit 20 has extracted a feature amount regarding overlap between the timing of receiving data C and the timing of receiving data b.

In this case, the control unit 20 performs processing for stopping the reception of either one (e.g., the data C of the communication method #1 in FIG. 2). For example, if the GW-controlled communication unit 10a-1 is communicating with the terminal device 30-1 using the communication method #1, the control unit 20 prevents the terminal device 30-1 from transmitting a beacon signal indicating permission to the GW-controlled communication unit 10a-1. As a result, the terminal device 30-1 does not transmit the data C, and overlap with the data b can be avoided.

Data transmission from the gateway device 1 (i.e., in the downlink direction) is always controlled by the GW as described above, and therefore if data to be transmitted to the terminal device 30-1 is stored in the GW-controlled communication unit 10a-1, the GW-controlled communication unit 10a-1 receives the control information and stops the transmission of the stored data to the terminal device 30-1.

(Example of Feature Amount (Pattern 2: Allocation of Other Communication Methods to Unallocated Period))

Figure 3:
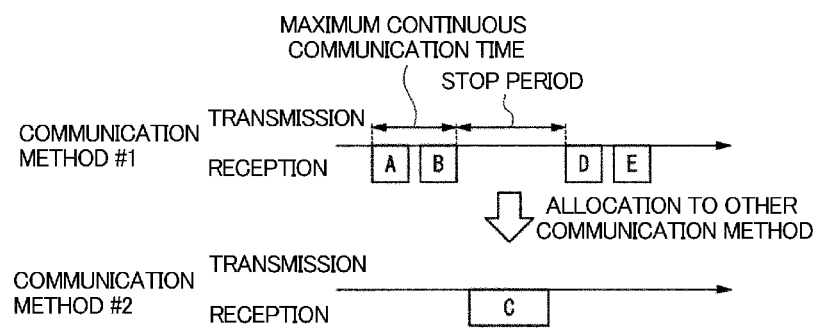
FIG. 3 is a diagram showing an example (pattern 2) of a feature amount in the above embodiment.

In FIG. 3, the communication method #1 and the communication method #2 are either a GW-controlled method or a terminal-controlled method. Using the communication unit individual information, the control unit 20 extracts, as a feature amount, information indicating that the communication method #1 defines a stop period having a predetermined length after reception of a signal during the maximum continuous communication time. The stop period is an unallocated period in which a communication method for transmitting or receiving a signal has not been allocated. For this reason, after reception of the data A and the data B in the communication method #1 and then the maximum continuous communication time has elapsed, the control unit 20 allocates the stop period as a period for reception in the communication method #2.

For example, if the GW-controlled communication unit 10a-1 is performing communication using the communication method #2, the control unit 20 outputs control information for starting the transmission of a beacon signal indicating transmission permission to the GW-controlled communication unit 10a-1. As a result, the wireless communication system 50 can effectively use the communication band during the stop period.

As described above, the gateway device 1 always controls data transmission from the gateway device 1, that is, in the downlink direction. For this reason, for example, if data to be transmitted to the terminal device 30-1 is stored in the terminal-controlled communication unit 10b-1 that performs communication using the communication method #2, the terminal-controlled communication unit 10*b*-1 receives the control information and starts the transmission of the stored data to the terminal device 30-1.

Also, instead of extracting the stop period from the communication unit individual information, the control unit 20 may extract, as a feature amount, a free state in which none of the communication units 10 transmit/receive signals.

For example, with TDMA (Time Division Multiple Access), one communication method is allocated to each time slot, that is, a time frame having a predetermined length. If the time used for signal transmission or reception in one time slot can be detected in advance, the remaining time in that time slot can be detected as a free state.

The free state period can be said to be an unallocated period in which a communication method for transmitting and receiving signals has not been allocated. For this reason, for the free state period, the control unit 20 allocates any one communication method that was not originally permitted to transmit/receive signals in the time slot, such that signals can be transmitted/received in that communication method. As a result, the wireless communication system 50 can effectively use the communication band during a free state period.

(Example of Feature Amount (Pattern 3: Stopping of Other Communication Methods During Occupied Period))

Figure 4:
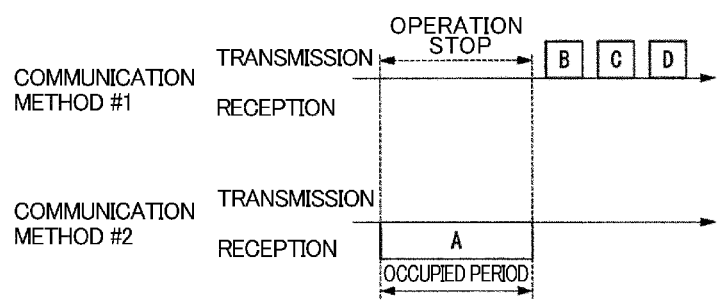
FIG. 4 is a diagram (part 1) showing an example (Pattern 3) of a feature amount in the above embodiment.

In FIG. 4, the communication method #1 and the communication method #2 are either a GW-controlled method or a terminal-controlled method. The control unit 20 extracts an occupied period of the communication method #2 as a feature amount from the communication unit individual information.

Figure 5:
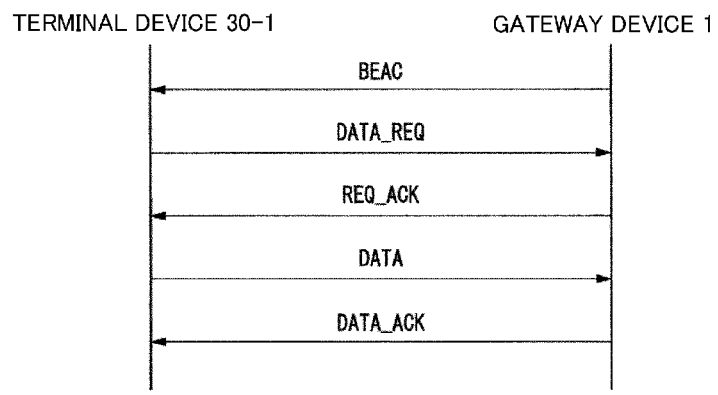
FIG. 5 is a diagram (part 2) showing an example (Pattern 3) of a feature amount in the above embodiment.

Here, the occupied period is, for example, the time from the start to the end of a continuous communication sequence arising for one signal, as shown in FIG. 5. In FIG. 5, in response to the transmission of the beacon signal (BEAC), the communication sequence of DATA_REQ, REQ_ACK, DATA, and DATA_ACK occurs. In this case, the time from the transmission of the first beacon signal (BEAC) to the reception of the response signal (DATA_ACK) is the occupied period.

As shown in FIG. 5, signal transmission and reception is not performed during the entirety of the occupied period, but if transmission or reception is performed with another communication method within the occupied period, there is a high possibility that transmission timing collisions or interference between transmission waves and reception waves will occur. For this reason, the control unit 20 generates a control signal for stopping signal transmission/reception during the occupied period, and outputs the generated control signal to the communication unit 10 that uses the communication method #1. Upon receiving the control signal, the communication unit 10 stops signal transmission and reception.

The occupied period can be calculated based on the continuous communication sequence shown in FIG. 5, as well as the environmental congestion amount, the required communication data amount, and the like. The environmental congestion amount is an index indicating the difficulty of communication. For example, in the case of a GW-controlled method, if responses to one beacon signal are obtained from multiple terminal devices 30-1, 30-2, etc. before uplink data transmission triggered by the beacon signal is started, it is anticipated that the time for subsequent data transmission will be long. In this case, the amount of environmental congestion increases and the occupied period also increases. Also, when the required communication data amount is large, the time required for data transmission is long, and therefore the occupied period is long.

In the above configuration of the basic embodiment, the control unit 20 provided in the gateway device 1 schedules operations of the communication units 10 so as to prevent the overlapping of periods in which the communication units 10 transmit and receive signals to and from the terminal devices 30-1, 30-2, etc. This scheduling is performed based on the communication unit individual information that is acquired from the communication units 10 by the control unit 20 and includes at least information indicating characteristics of the communication methods of the communication units 10. Accordingly, even if multiple communication methods are used in parallel, the wireless communication system 50 can prevent collision and interference from occurring between the communication methods and prevent deterioration of communication characteristics.

Hereinafter, embodiments will be described in detail. Specifically, in a first embodiment, the "timing adjustment" of pattern 1 will be described in detail. In second and third embodiments, the "allocation of other communication methods to unallocated period" of pattern 2 is described in detail. In fourth, fifth, and sixth embodiments, the "stopping of other communication methods during occupied period" of pattern 3 is described in detail.

First Embodiment

Figure 6:
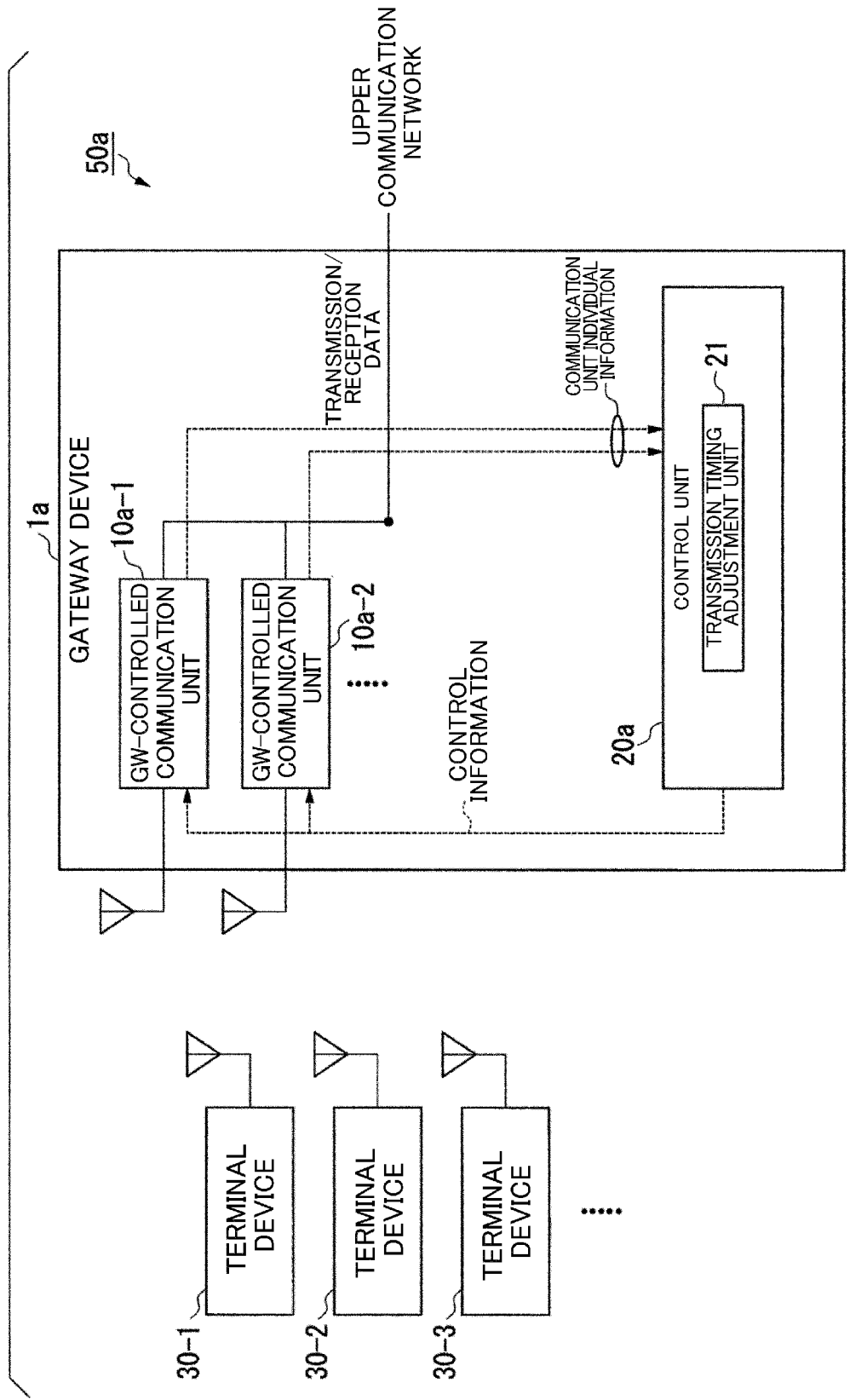
FIG. 6 is a block diagram showing a configuration of a wireless communication system in a first embodiment.

FIG. 6 is a block diagram showing the configuration of a wireless communication system 50*a* of the first embodiment. In the first embodiment, configurations that are the same as those in the basic embodiment are designated by the same reference numerals, and different configurations will be described below.

The wireless communication system 50*a* includes multiple terminal devices 30-1, 30-2, etc., and a gateway device 1*a*. The gateway device 1*a* includes multiple GW-controlled communication units 10*a* and a control unit 20*a*. The control unit 20*a* includes a transmission timing adjustment unit 21.

In the control unit 20*a*, the transmission timing adjustment unit 21 adjusts the timing of beacon signal transmission by the GW-controlled communication units 10*a*-1, 10*a*-2, etc. so as to prevent the overlapping of periods in which the GW-controlled communication units 10*a*-1, 10*a*-2, etc. transmit and receive signals to and from the terminal devices 30-1, 30-2, etc.

(Processing in Wireless Communication System of First Embodiment)

Next, the flow of processing performed by the wireless communication system 50*a* of the first embodiment will be described with reference to FIGS. 7 to 9.

Figure 7:
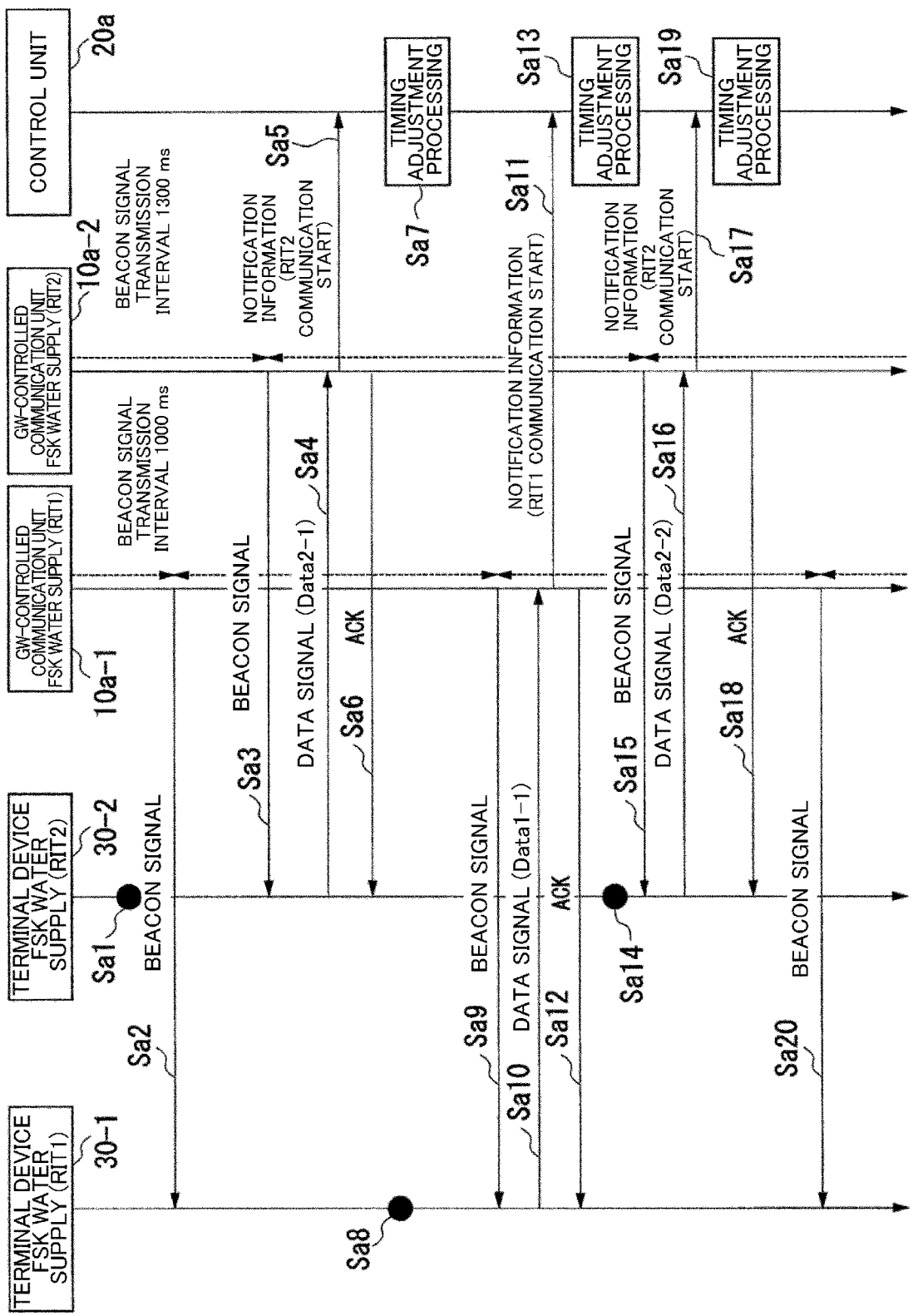
FIG. 7 is a sequence diagram (part 1) showing a flow of processing performed by the wireless communication system in the above embodiment.
Figure 9:
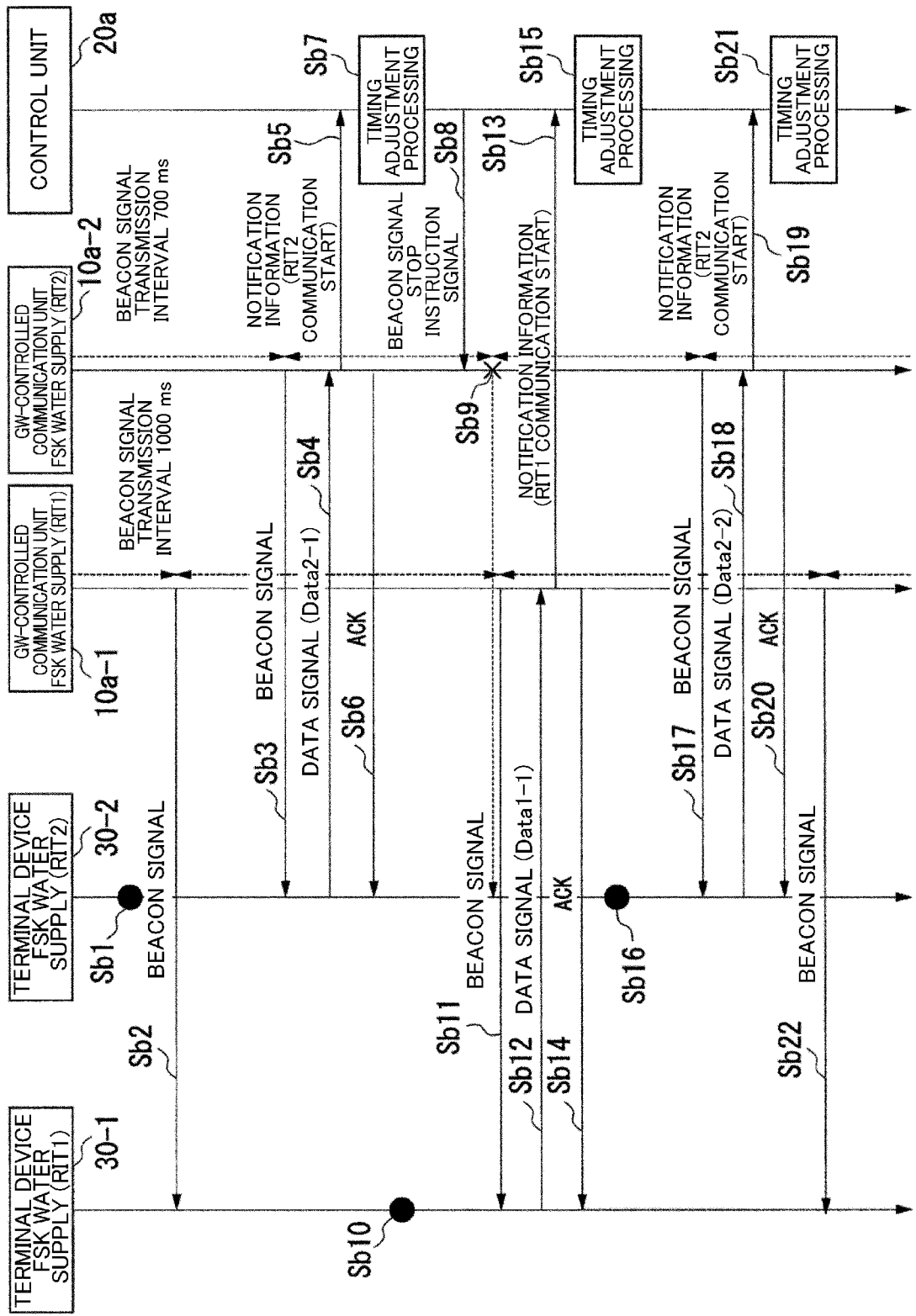
FIG. 9 is a sequence diagram (part 2) showing a flow of processing performed by the wireless communication system in the above embodiment.

FIGS. 7 and 9 are sequence diagrams that show the flow of processing for uplink data transmission in two combinations, namely the GW-controlled communication unit 10*a*-1 and the terminal device 30-1, and the GW-controlled communication unit 10*a*-2 and the terminal device 30-2. FSK water supply is applied as the communication method, and RIT is applied as the MAC protocol.

Figure 8:
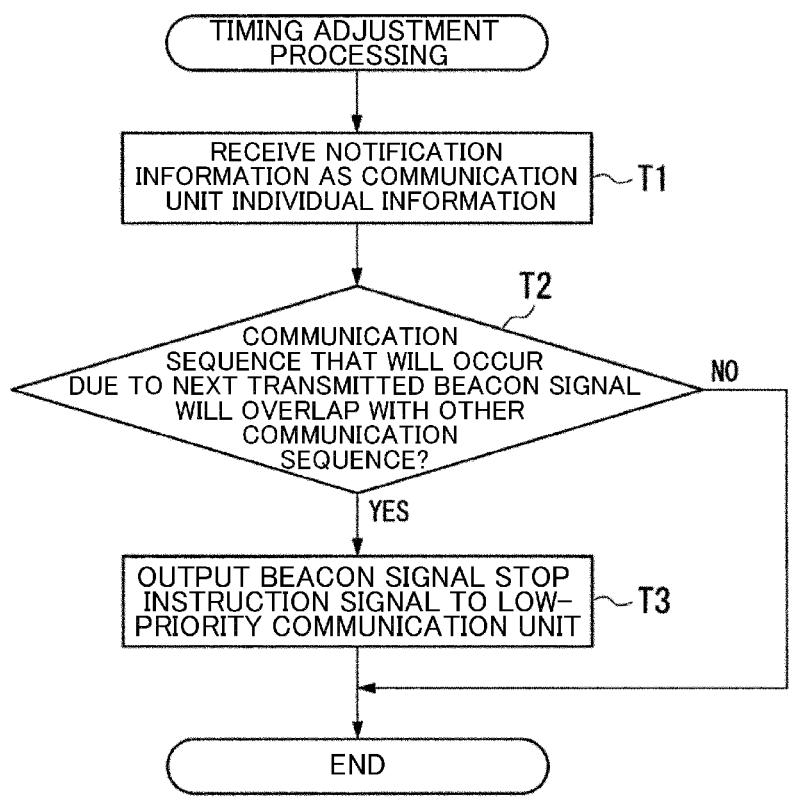
FIG. 8 is a flowchart showing a flow of processing performed by a transmission timing adjustment unit in the above embodiment.

FIG. 8 is a flowchart showing a flow of processing performed by the transmission timing adjustment unit 21 of the control unit 20*a* in FIGS. 7 and 9.

Before the processing shown in FIGS. 7 and 9 is performed, when the gateway device 1*a* is activated for example, the control unit 20*a* acquires communication unit individual information from the GW-controlled communication units 10*a*-1 and 10*a*-2.

In the example shown in FIG. 7, 1000 ms has been determined in advance as the beacon transmission interval of the GW-controlled communication unit 10a-1. Also, 1300 ms has been determined in advance as the beacon transmission interval of the GW-controlled communication unit 10a-2.

A communication request for transmitting data (Data2-1) is generated in the terminal device 30-2 (step Sa1). The GW-controlled communication unit 10a-1 transmits the beacon signal to the corresponding terminal device 30-1 at the beacon transmission interval timing (step Sa2). The terminal device 30-1 receives the beacon signal from the GW-controlled communication unit 10a-1, but does not perform data transmission in the uplink direction because a communication request has not been generated.

The GW-controlled communication unit 10a-2 transmits the beacon signal to the corresponding terminal device 30-2 at the beacon transmission interval timing (step Sa3). The terminal device 30-2 receives the beacon signal from the GW-controlled communication unit 10a-2 and transmits a data signal that includes the stored data (Data2-1) to the GW-controlled communication unit 10a-2 (step Sa4).

The GW-controlled communication unit 10a-2 receives the data signal from the terminal device 30-2, and transmits the data (Data2-1) included in the received data signal to the upper communication network according to the destination. The GW-controlled communication unit 10a-2 outputs notification information that includes information on the start time of the reception of the data signal from the terminal device 30-2, to the transmission timing adjustment unit 21 of the control unit 20a (step Sa5). When the reception of the data signal is complete, the GW-controlled communication unit 10a-2 transmits a response signal (ACK) to the terminal device 30-2 (step Sa6).

The transmission timing adjustment unit 21 of the control unit 20a starts the timing adjustment processing shown in FIG. 8 (step Sa7).

(Timing Adjustment Processing)

Here, the timing adjustment processing will be described with reference to FIG. 8. The transmission timing adjustment unit 21 obtains the notification information output by any of the GW-controlled communication units 10a-1 and 10a-2 as communication unit individual information (step T1). Here, it is assumed that the transmission timing adjustment unit 21 has obtained the notification information output by the GW-controlled communication unit 10a-2.

Based on the time information included in the obtained notification information and the pre-obtained communication unit individual information that includes information indicating the timing of the communication method, the transmission timing adjustment unit 21 determines whether or not the communication sequence of the other GW-controlled communication unit 10a-1 overlaps with the communication sequence of the GW-controlled communication unit 10a-2 (step T2).

In the case of determining that there is overlap (step T2, Yes), the transmission timing adjustment unit 21 outputs a beacon signal stop instruction signal to whichever one of the GW-controlled communication units 10a-1 and 10a-2 has a lower priority, based on priorities determined in advance for each of the GW-controlled communication units 10a-1 and 10a-2 (step T3). Note that it is assumed here that the priority of each of the GW-controlled communication units 10a-1 and 10a-2 is included in the communication unit individual information of the GW-controlled communication units 10a-1 and 10a-2.

Whichever one of the GW-controlled communication units 10a-1 and 10a-2 that received the beacon signal stop instruction signal skips the beacon signal, that is, does not perform beacon signal transmission. On the other hand, if the transmission timing adjustment unit 21 determines that there is no overlap (steps T2, No), the processing is ended because it is not necessary to skip the beacon signal.

For example, in step T2, the transmission timing adjustment unit 21 determines whether or not the communication sequence of the other GW-controlled communication unit 10a-1 overlaps with the communication sequence of the GW-controlled communication unit 10a-2, based on whether or not the remaining time until the transmission of the next beacon signal by the GW-controlled communication unit 10a-1 exceeds the time required for one communication sequence of the GW-controlled communication unit 10a-2.

If the remaining time until the transmission of the next beacon signal by the GW-controlled communication unit 10a-1 exceeds the time required for one communication sequence of the GW-controlled communication unit 10a-2, the transmission timing adjustment unit 21 determines that the communication sequence of the GW-controlled communication unit 10a-1 and the communication sequence of the GW-controlled communication unit 10a-2 do not overlap.

On the other hand, if the remaining time until the transmission of the next beacon signal by the GW-controlled communication unit 10a-1 is less than or equal to the time required for one communication sequence of the GW-controlled communication unit 10a-2, the transmission timing adjustment unit 21 determines that the communication sequence of the GW-controlled communication unit 10a-1 and the communication sequence of the GW-controlled communication unit 10a-2 overlap.

In step T2, if the transmission timing adjustment unit 21 obtains notification information of the GW-controlled communication unit 10a-1 instead of notification information of the GW-controlled communication unit 10a-2, the above-described relationship between the GW-controlled communication units 10a-1 and 10a-2 is reversed.

At the timing of step Sa1 shown in FIG. 7, the transmission timing adjustment unit 21 determines that the communication sequence of the GW-controlled communication unit 10a-1 and the communication sequence of the GW-controlled communication unit 10a-2 do not overlap (step T2, No), and a beacon signal stop instruction signal is not output.

Next, assume here that a communication request for transmitting data (Data1-1) is generated in the terminal device 30-1 (step Sa8). The GW-controlled communication unit 10a-1 transmits the beacon signal to the corresponding terminal device 30-1 at the beacon transmission interval timing (step Sa9). The terminal device 30-1 receives the beacon signal from the GW-controlled communication unit 10a-1 and transmits a data signal that includes the stored data (Data1-1) to the GW-controlled communication unit 10a-1 (step Sa10).

The GW-controlled communication unit 10a-1 receives the data signal from the terminal device 30-1 and transmits the data (Data1-1) included in the received data signal to the upper communication network according to the destination. The GW-controlled communication unit 10a-1 outputs notification information that includes information on the start time of the reception of the data signal from the terminal device 30-1, to the transmission timing adjustment unit 21 of the control unit 20a (step Sa11). When the reception of the data signal is complete, the GW-controlled communication unit 10a-1 transmits a response signal (ACK) to the terminal device 30-1 (step Sa12).

The transmission timing adjustment unit 21 of the control unit 20a starts the timing adjustment processing shown in FIG. 8 (step Sa13). At the timing of step Sa13, the transmission timing adjustment unit 21 determines that the communication sequence of the GW-controlled communication unit 10a-1 and the communication sequence of the GW-controlled communication unit 10a-2 do not overlap (steps T2, No), and a beacon signal stop instruction signal is not output.

Assume here that a communication request for transmitting data (Data2-2) is generated again in the terminal device 30-2 (step Sa14). The GW-controlled communication unit 10a-2 transmits the beacon signal to the corresponding terminal device 30-2 at the beacon transmission interval timing (step Sa15). The terminal device 30-2 receives the beacon signal from the GW-controlled communication unit 10a-2 and transmits a data signal that includes the accumulated data (Data2-2) to the GW-controlled communication unit 10a-2 (step Sa16).

The GW-controlled communication unit 10a-2 receives the data signal from the terminal device 30-2 and transmits the data (Data2-2) included in the received data signal to the upper communication network according to the destination. The GW-controlled communication unit 10a-2 outputs notification information that includes information on the start time of the reception of the data signal from the terminal device 30-2, to the transmission timing adjustment unit 21 of the control unit 20a (step Sa17). When the reception of the data signal is complete, the GW-controlled communication unit 10a-2 transmits a response signal (ACK) to the terminal device 30-2 (step Sa18).

The transmission timing adjustment unit 21 of the control unit 20a starts the timing adjustment processing shown in FIG. 8 (step Sa19). Even at the timing of step Sa19, the transmission timing adjustment unit 21 determines that the communication sequence of the GW-controlled communication unit 10a-1 and the communication sequence of the GW-controlled communication unit 10a-2 do not overlap (steps T2, No), and a beacon signal stop instruction signal is not output. The GW-controlled communication unit 10a-1 transmits the beacon signal to the corresponding terminal device 30-1 at the beacon transmission interval timing (step Sa20).

In the example shown in FIG. 7, the transmission interval of the beacon signal is appropriately determined in advance, and the transmission timing of the beacon signal by the GW-controlled communication units 10a-1 and 10a-2 is appropriately determined. For this reason, in the timing adjustment processing, the transmission timing adjustment unit 21 normally transmits data in the uplink direction to the GW-controlled communication units 10a-1 and 10a-2 in a nested state without outputting the beacon signal stop instruction signal.

Next, in the example shown in FIG. 9, the beacon transmission interval of the GW-controlled communication unit 10a-1 has been determined in advance to be 1000 ms. Also, the beacon transmission interval of the GW-controlled communication unit 10a-2 has been determined in advance to be 700 ms.

The processing of steps Sb1 to Sb6 shown in FIG. 9 performed by the GW-controlled communication unit 10a-1, 10a-1 and the terminal devices 30-1, 30-2 is the same as that of steps Sa1 to Sa6 shown in FIG. 7.

The transmission timing adjustment unit 21 of the control unit 20a starts the timing adjustment processing shown in FIG. 8 (step Sb7). At the timing of step Sb7 shown in FIG. 9, the transmission timing adjustment unit 21 determines that the communication sequence of the GW-controlled communication unit 10a-1 and the communication sequence of the GW-controlled communication unit 10a-2 overlap (step T2, Yes). The transmission timing adjustment unit 21 outputs a beacon signal stop instruction signal to whichever one has a lower priority. Here, it is assumed that the priority of the GW-controlled communication unit 10a-2 is lower than that of the GW-controlled communication unit 10a-1, and the transmission timing adjustment unit 21 outputs the beacon signal stop instruction signal to the GW-controlled communication unit 10a-2 (step Sb8). The GW-controlled communication unit 10a-2 receives the beacon signal stop instruction signal and skips the transmission of the beacon signal (step Sb9).

The processing of steps Sb10 to Sb22 shown in FIG. 9 performed by the GW-controlled communication units 10a-1 and 10a-2 and the terminal devices 30-1 and 30-2 is the same as that of steps Sa8 to Sa20 shown in FIG. 7.

In the example shown in FIG. 9, the beacon signal transmission interval is not suitable. For this reason, the communication sequence of the GW-controlled communication unit 10a-1 triggered by the beacon signal transmitted at the timing of step Sb11 and the communication sequence of the GW-controlled communication unit 10a-2 triggered by the beacon signal transmitted at the timing of step Sb9 will overlap. In step Sb7, the transmission timing adjustment unit 21 performs the timing adjustment processing to skip the transmission of the beacon signal by the GW-controlled communication unit 10a-2 such that the communication sequence can be nested, thus making it possible to avoid an overlap. This makes it possible to avoid collisions and interference of data transmission in the uplink direction.

In the configuration of the first embodiment described above, based on communication unit individual information, the transmission timing adjustment unit 21 of the control unit 20a adjusts the timing of beacon signal transmission performed by multiple GW-controlled communication units 10a such that the periods of signal transmission/reception performed by the GW-controlled communication units 10a with the terminal devices 30-1, 30-2, etc. do not overlap with each other. As a result, the wireless communication system 50a can prevent collisions between communication sequences pertaining to uplink data transmission performed in response to beacon signals transmitted by the plurality of GW-controlled communication units 10a, thus making it possible to prevent deterioration of communication characteristics.

Note that in the configuration of the first embodiment described above, the communication method of the GW-controlled communication units 10a-1 and 10a-2 is not limited to being FSK water supply, and any communication method may be used as long as it is a GW-controlled method. Also, the MAC protocol may be a protocol other than RIT.

Moreover, in the configuration of the first embodiment described above, an example of timing adjustment for two GW-controlled communication units 10a-1 and 10a-2 is shown, but timing adjustment may be performed for three or more GW-controlled communication units 10a. In this case, in step T3 of the timing adjustment processing shown in FIG. 8, if there are three or more GW-controlled communication units 10a that have overlapping communication sequences, in order to maintain the transmission/reception of signals by whichever one of the GW-controlled communication units 10a has the highest priority, the transmission timing adjustment unit 21 may output the beacon signal stop instruction signal to the other GW-controlled communication units 10*a*.

Also, although the priority is determined according to the operation aspect, as one example, because the GW-controlled communication unit 10*a* that has the longest beacon signal transmission interval has the fewest opportunities for data transmission, the priority may be set in order of the longest beacon signal transmission interval.

Second Embodiment

Figure 10:
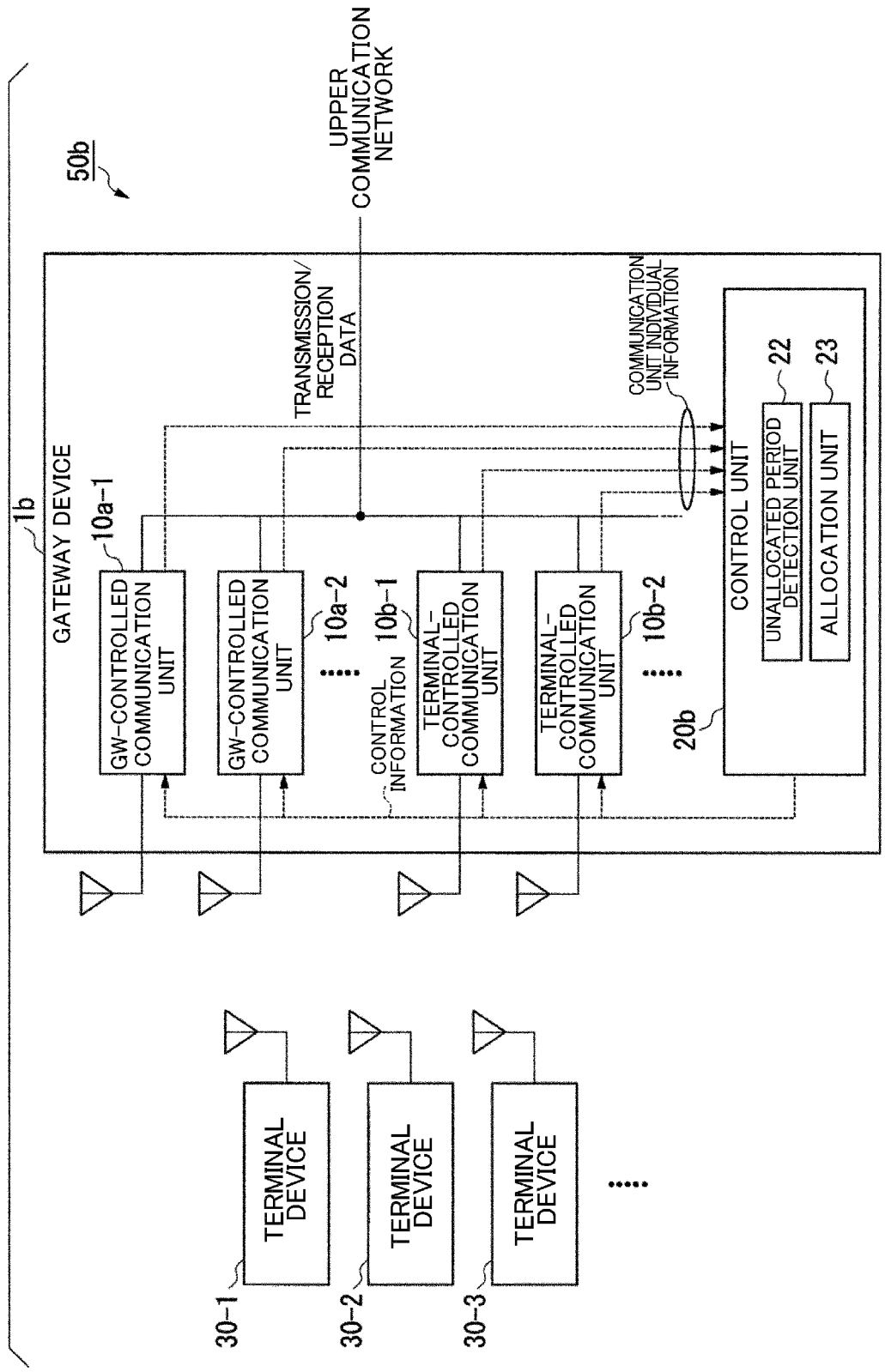
FIG. 10 is a block diagram showing a configuration of a wireless communication system in a second embodiment.

FIG. 10 is a block diagram showing the configuration of a wireless communication system 50*b* according to a second embodiment. Configurations that are the same as those of the basic embodiment are designated by the same reference numerals, and different configurations will be described below.

The wireless communication system 50*b* includes multiple terminal devices 30-1, 30-2, etc., and a gateway device 1*b*. The gateway device 1*b* includes multiple GW-controlled communication units 10*a*, multiple terminal-controlled communication units 10*b*, and a control unit 20*b*. The control unit 20*b* includes an unallocated period detection unit 22 and an allocation unit 23.

In the control unit 20*b*, the unallocated period detection unit 22 detects an unallocated period in which all the communication units 10 do not transmit/receive signals based on communication unit individual information.

The following describes the unallocated period in the second embodiment. All LPWA communication methods are required to operate in accordance with Radio Law Regulations, for example, the restrictions of ARIB T-108, etc., and the restrictions of the operating standards specified in each communication method standard. One example of a restriction is that in a certain communication method, when signal transmission is performed using all of the maximum continuous communication time, the shortest wave stop period is set.

For example, in EnOcean, which is one LPWA communication method and is a terminal-controlled method, the terminal devices 30-1, 30-2, etc. start data transmission at an arbitrary timing. IN EnOcean operational standards, as Network layer control, it is defined that the same telegram may be transmitted at least once and at most twice in a maximum of 50 ms. It is also defined that a wave stop period is provided for a minimum of 50 ms before the next telegram is transmitted.

During the minimum wave stop period, data transmission cannot be performed in the communication method. Therefore, the minimum wave stop period can be said to be a stop period in which all communication units 10 stop transmitting and receiving signals. In other words, it can be said that the stop period is an unallocated period in which no communication units 10 are given an opportunity to transmit and receive signals.

The allocation unit 23 allocates any one of the GW-controlled communication units 10*a* to the unallocated period detected by the unallocated period detection unit 22, that is, the stop period, and allows the transmission and reception of signals.

(Processing in Control Unit of Second Embodiment)

Next, the flow of processing performed by the unallocated period detection unit 22 and the allocation unit 23 of the control unit 20*b* of the second embodiment will be described with reference to FIGS. 11 and 12. In the example shown in FIGS. 11 and 12, it is assumed that the gateway device 1*b* includes multiple GW-controlled communication units 10*a* and one terminal-controlled communication unit 10*b*-1. Also, the terminal-controlled communication unit 10*b*-1 transmits and receives signals to and from the terminal device 30-1, and the GW-controlled communication units 10*a* transmit and receive signals to and from corresponding terminal device 30-2, 30-3, etc.

The communication method of the terminal-controlled communication unit 10*b*-1 is, for example, a terminal-controlled communication method such as EnOcean, and the communication method is shown as communication method #1. Also, the communication method of the GW-controlled communication units 10*a* is, for example, a GW-controlled communication method such as Wide Area Seven, and the communication method is shown as communication method #2.

Figure 11:
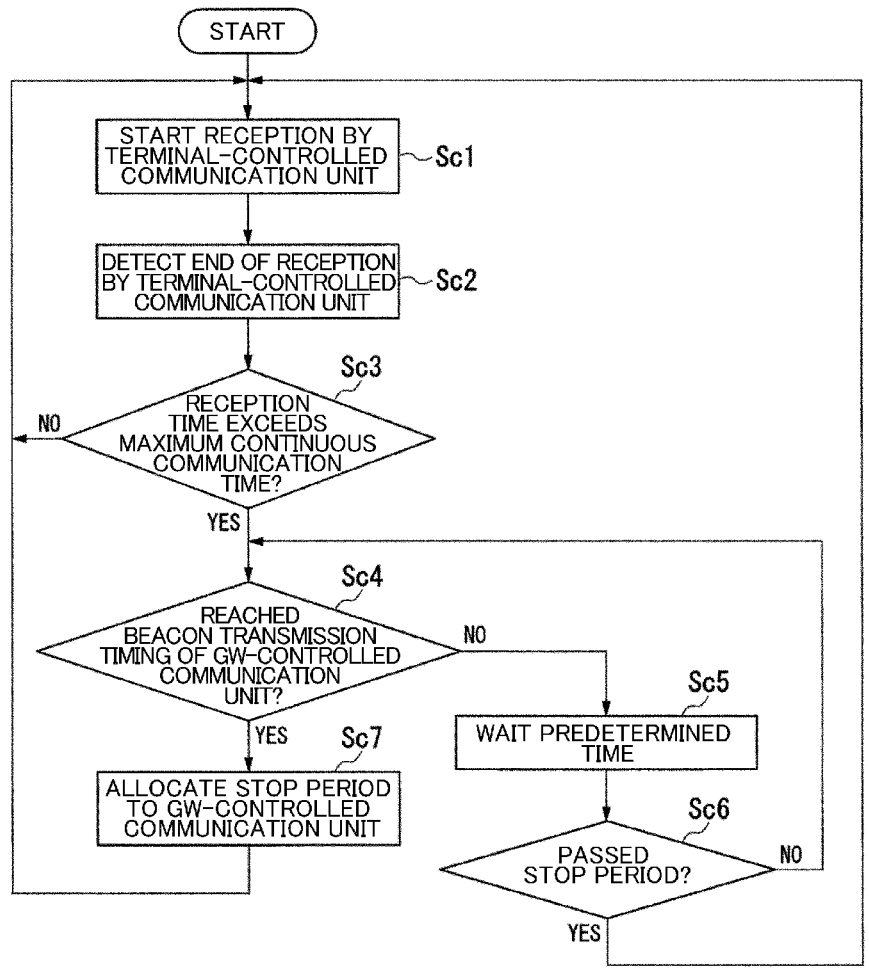
FIG. 11 is a flowchart showing a flow of processing performed by an unallocated period detection unit and an allocation unit in the above embodiment.

Before the processing shown in FIG. 11 is performed, for example, when the gateway device 1*b* is started, the control unit 20*b* acquires communication unit individual information from the terminal-controlled communication unit 10*b*-1 and the GW-controlled communication units 10*a*.

The unallocated period detection unit 22 of the control unit 20*b* obtains notification information that includes information indicating the start of reception of the signal output by the terminal-controlled communication unit 10*b*-1 (step Sc1). The unallocated period detection unit 22 of the control unit 20*b* obtains notification information that includes information indicating the end of reception of the signal output by the terminal-controlled communication unit 10*b*-1 (step Sc2).

Based on the information indicating the start and end of reception included in the two pieces of obtained notification information, the unallocated period detection unit 22 calculates a reception time that indicates the length of time for which the terminal-controlled communication unit 10*b*-1 received a signal from the terminal device 30-1. The unallocated period detection unit 22 reads out information indicating the maximum continuous communication time from the communication unit individual information of the communication method #1, which is the communication method of the terminal-controlled communication unit 10*b*-1.

The unallocated period detection unit 22 determines whether or not the calculated reception time exceeds the maximum continuous communication time (step Sc3). If the unallocated period detection unit 22 determines that the calculated reception time does not exceed the maximum continuous communication time (step Sc3, No), processing returns to step Sc1.

If the unallocated period detection unit 22 has determined that the calculated reception time exceeds the maximum continuous communication time (step Sc3, Yes), the allocation unit 23 determines, based on the communication unit individual information of each of the GW-controlled communication units 10*a*, whether or not a timing for transmission of the beacon signal by any of the GW-controlled communication units 10*a* exists within the predetermined beacon signal transmission possible time (step Sc4).

Here, the beacon signal transmission possible time means, for example, a length obtained by subtracting the time required for the GW-controlled communication units 10*a* to transmit and receive signals to and from corresponding terminal devices 30-2, 30-3, etc. from the length of the remaining stop period at the time of determination in step Sc4. Even if a beacon signal is transmitted within the remaining stop period, the data transmission may not be completed within the stop period. For this reason, the time required for data transmission is subtracted from the remaining stop time, and the determination is made based on the beacon signal transmission possible time obtained by the subtraction. For example, in the case of the GW-controlled communication unit 10a-1, the time required for the GW-controlled communication unit 10a-1 to perform signal transmission/reception with the terminal device 30-2 is the time from when the GW-controlled communication unit 10a-1 transmits the beacon signal until when the terminal device 30-2 receives a response signal (ACK) from the GW-controlled communication unit 10a-1 after the terminal device 30-2 performs data transmission.

The allocation unit 23 determines that a timing for transmission of the beacon signal by any of the GW-controlled communication units 10a exists within the beacon signal transmission possible time (step Sc4, Yes). As a result of the determination, if multiple GW-controlled communication units 10a are targeted, the allocation unit 23 selects the GW-controlled communication unit 10a that is to transmit the beacon signal at the earliest time. Here, as an example, assume that the allocation unit 23 selects the GW-controlled communication unit 10a-1.

The allocation unit 23 allocates the stop period after the maximum continuous communication time to the GW-controlled communication unit 10a-1 (step Sc7). During the allocated stop period, the GW-controlled communication unit 10a-1 transmits a beacon signal to the terminal device 30-1.

On the other hand, if the GW-controlled communication unit 10a-1 determines that a timing for transmitting the beacon signal does not exist within the beacon signal transmission possible time (step Sc4, No), the allocation unit 23 waits for a certain period of time (step Sc5), acquires time information from a time measuring means such as a clock provided in the gateway device 1b, and determines whether or not the acquired time is past the stop period based on the acquired time information and the stop period (step Sc6).

If the allocation unit 23 determines that the acquired time is past the stop period (step Sc6, Yes), processing returns to step Sc1. On the other hand, if the allocation unit 23 determines that the acquired time is not past the stop period (step Sc6, No), the allocation unit 23 performs the processing of step Sc4 again.

Figure 12:
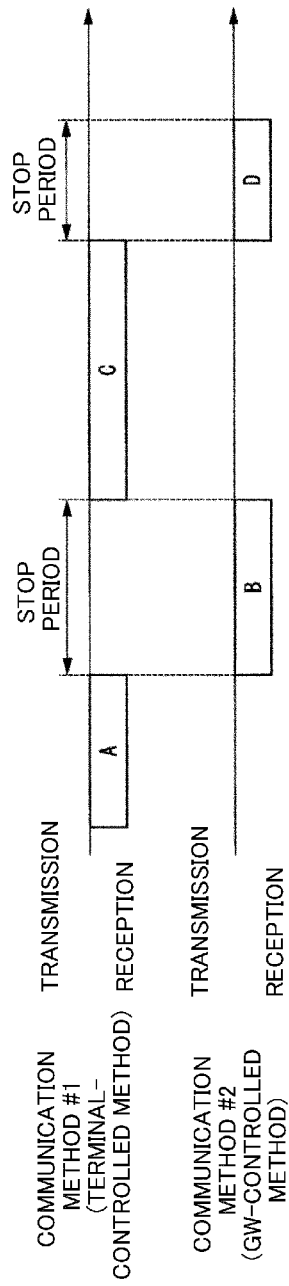
FIG. 12 is a diagram showing processing performed by the unallocated period detection unit and the allocation unit in the above embodiment.

Accordingly, as shown in FIG. 12, the terminal-controlled communication unit 10b-1 receives the data A transmitted by the terminal device 30-2, and if the reception time from the start to the end of the reception of the data A exceeds the maximum continuous communication period, a stop period is provided. Then, if the GW-controlled communication unit 10a-1 can transmit the beacon signal during the beacon signal transmission possible time, the terminal device 30-1 can transmit the data B in the uplink direction.

In the configuration of the second embodiment described above, the unallocated period detection unit 22 of the control unit 20b detects a stop period in which all communication units 10 stop transmitting and receiving signals based on the communication unit individual information. The allocation unit 23 of the control unit 20b allocates any one of the communication units 10 to the stop period detected by the unallocated period detection unit 22, and allows signal transmission or reception. During the stop period, signal collisions and interference are guaranteed to not occur. For this reason, the wireless communication system 50b can use the stop period to transmit and receive signals without collision or interference, thus preventing deterioration of communication characteristics. Also, by using the stop period, the wireless communication system 50b can effectively use the communication band.

Note that in the example of the second embodiment shown above, the allocation unit 23 allocates any one of the GW-controlled communication units 10a, but the allocation unit 23 may allocate any one of the other terminal-controlled communication units 10b-2, 10b-3, etc. It should be noted that in the uplink direction, allocating a GW-controlled method makes it possible to transmit the beacon signal from the gateway device 1b side and actively start data transmission. For this reason, from the viewpoint of the efficient use of the stop period, it can be said that it is preferable for the allocation unit 23 to allocate a GW-controlled method.

Also, in the example of the second embodiment shown above, the unallocated period detection unit 22 detects a stop period based on the characteristics of the uplink communication sequence in the terminal-controlled communication unit 10b-1, but the stop period may be detected based on the characteristics of the downlink communication sequence in the terminal-controlled communication unit 10b-1. Also, the unallocated period detection unit 22 may detect a stop period based on the characteristics of the uplink or the downlink communication sequence in the GW-controlled communication units 10a-1, 10a-2, etc.

Third Embodiment

Figure 13:
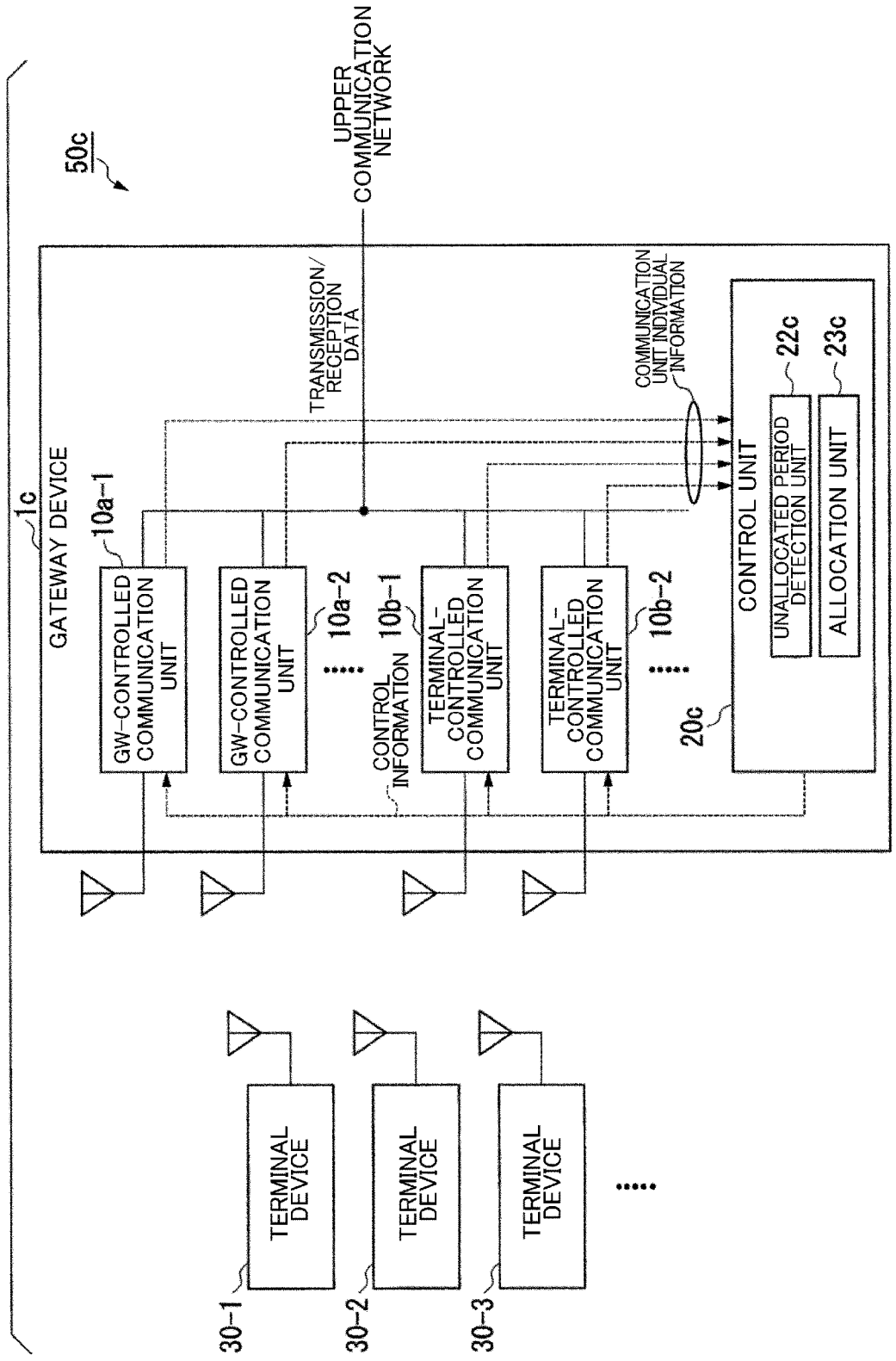
FIG. 13 is a block diagram showing a configuration of a wireless communication system in a third embodiment.

FIG. 13 is a block diagram showing the configuration of a wireless communication system 50c according to a third embodiment. Configurations that are the same as those of the basic embodiment are designated by the same reference numerals, and different configurations will be described below.

The wireless communication system 50c includes multiple terminal devices 30-1, 30-2, etc., and a gateway device 1c. The gateway device 1c includes multiple GW-controlled communication units 10a, multiple terminal-controlled communication units 10b, and a control unit 20c. The control unit 20c includes an unallocated period detection unit 22c and an allocation unit 23c.

In the control unit 20c, the unallocated period detection unit 22c detects an unallocated period in which none of the GW-controlled communication units 10a and none of the terminal-controlled communication units 10b transmit or receive signals based on the communication unit individual information.

The following describes the unallocated period in the third embodiment. For example, in TDMA, any one communication method is allocated to a time-division time slot. Within the time of the time slot, only communication in the allocated communication method is performed.

In the case where the allocated communication method is a GW-controlled communication method, assume that the terminal device 30-1, 30-2, etc. have not responded within the predetermined response time limit in response to the beacon signal transmitted to the terminal devices 30-1, 30-2, etc. at the beginning time of the time slot. In this case, since GW-controlled uplink data transmission does not occur within the remaining time after that time slot, a free state is created. The unallocated period detection unit 22c detects this free state as an unallocated period.

The allocation unit 23c allocates the terminal-controlled communication unit 10b to the unallocated period, that is the free state period, detected by the unallocated period detection unit 22. Note that at the time of allocation, the allocation unit 23c may allocate multiple terminal-controlled communication units 10b, or may allocate any one of the terminal-controlled communication units 10b.

In a terminal-controlled method, the transmission timing of the terminal devices 30-1, 30-2, etc. basically cannot be controlled by the gateway device 1. Therefore, if it becomes clear that the time slot (which was originally allocated to the GW-controlled method) is free and GW-controlled communication will not occur in the time slot thereafter, the allocation unit 23c allocates time to one or multiple terminal-controlled methods (pattern 2 end). After that, the gateway device 1 is in the reception standby state (multiple methods) within the time slot as long as time permits. However, if communication in one of the terminal-controlled methods starts at a certain timing, the control unit 20 outputs a control signal for stopping the transmission/reception of signals in other methods to the communication units 10 (pattern 3). Patterns 2 and 3 are mutually exclusive, but they can be executed in a serial manner with respect to time. In other words, the above processing can be realized.

(Processing in Control Unit of Third Embodiment)

Figure 14:
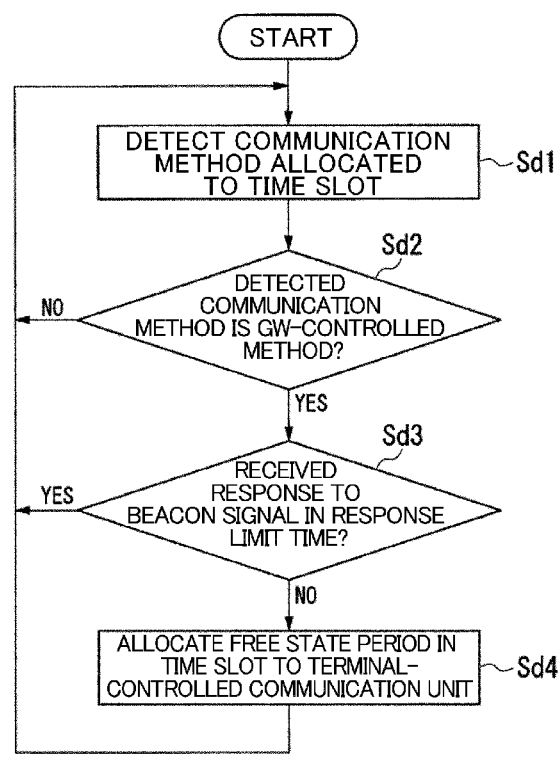
FIG. 14 is a flowchart showing a flow of processing performed by the unallocated period detection unit and the allocation unit in the above embodiment.

Next, the flow of processing performed by the unallocated period detection unit 22c and the allocation unit 23c of the control unit 20c of the third embodiment will be described with reference to FIG. 14. Before the processing shown in FIG. 14, for example, when the gateway device 1c is started, the control unit 20c acquires the communication unit individual information from all the communication units 10.

The unallocated period detection unit 22c detects the communication method allocated to the time slot (step Sd1). The unallocated period detection unit 22c determines whether or not the detected communication method is a GW-controlled method (step Sd2). If the unallocated period detection unit 22c determines that the detected communication method is not a GW-controlled method (step Sd2, No), processing returns to step Sd1.

On the other hand, if the unallocated period detection unit 22c determines that the detected communication method is a GW-controlled method (step Sd2, Yes), the unallocated period detection unit 22c detects the GW-controlled communication unit 10a that corresponds to the detected GW-controlled method. Here, it is assumed that the unallocated period detection unit 22c detects the GW-controlled communication unit 10a-1.

The unallocated period detection unit 22c determines whether or not the detected GW-controlled communication unit 10a-1 transmits the beacon signal to the terminal devices 30-1, 30-2, etc. in the target time slot, and receives a response signal, such as DATA_REQ in the case of the communication sequence of FIG. 5, from any of the terminal devices 30-1, 30-2, etc. within the response time limit (step Sd3).

If the unallocated period detection unit 22c determines that a response signal was received from any of the terminal devices 30-1, 30-2, etc. within the response time limit (step Sd3, Yes), processing returns to step Sd1.

On the other hand, if the unallocated period detection unit 22c determines that a response signal was not received from any of the terminal devices 30-1, 30-2, etc. within the response time limit (steps Sd3, No), the allocation unit 23c allocates the free state period of the time slot to a terminal-controlled communication unit 10b (step Sd4). As a result, the allocated terminal-controlled communication unit 10b enters the reception standby state, and if the terminal devices 30-1, 30-2, etc. operating in the terminal-controlled system transmit an uplink data signal, the allocated terminal-controlled communication unit 10b can receive the data signal.

Note that although the unallocated period detection unit 22c detects the free state period of the time slot in the case of the GW-controlled communication method in the example of the third embodiment described above, the unallocated period detection unit 22c may detect the free state period of the time slot in the case of a terminal-controlled communication method. For example, in the case of a terminal-controlled communication method that has a communication sequence that is characteristic when data is transmitted in the uplink direction, the free state period of the time slot can be detected based on the characteristic communication sequence.

Also, although the allocation unit 23c allocates a terminal-controlled communication unit 10b in the example of the third embodiment described above, another GW-controlled communication unit 10a-2, 10a-3, etc. other than the GW-controlled communication unit 10a-1 may be allocated to the free state period. In the uplink direction, allocating a GW-controlled method makes it possible to transmit the beacon signal from the gateway device 1c side and actively start data transmission. Therefore, from the viewpoint of efficient use of the free state period, it can be said that it is preferable that the allocation unit 23c allocates a GW-controlled method.

Also, the unallocated period detection unit 22c may detect the free state period of a time slot by the following method. For example, assume that the terminal devices 30-1, 30-2, etc. are smart meters that read the meter needles of a lifeline such as electric power, gas, or the like every 30 minutes. Assume that such a smart meter transmits a data signal in the uplink direction at a time interval such as at 8:00, 8:30, 9:00, 9:30, etc. by a terminal-controlled communication method. In this case, after 9:30, it can be predicted that upward data transmission will occur at 10:00 based on the periodicity of data signal transmission. Therefore, the unallocated period detection unit 22c can detect that the time excluding the time when the data transmission occurs periodically is the free state period of the time slot.

Also, in a certain terminal-controlled communication method, if three to five retransmissions occur in one uplink data transmission, it is possible to predict that three to five retransmissions will similarly occur the next time as well. Accordingly, the unallocated period detection unit 22c can detect that the time excluding the time when the first data transmission occurs and the time when the data retransmission occurs is the free state period of the time slot.

In other words, the unallocated period detection unit 22c can detect the free state period of a time slot based on not only prior information obtained from the communication unit individual information, but also periodicity information and trends and statistical amounts regarding past operating states such as retransmission.

For example, the control unit 20c may be provided with a machine learning function unit and perform machine learning for each communication method based on prior information, periodicity information, and trend and statistical information regarding past operating states. Due to providing such a machine learning function unit, when the unallocated period detection unit 22c detects a communication method allocated to a time slot, the machine learning function unit may obtain information indicating the usage state of the time slot in the detected communication method and detect a free state period of the time slot.

In the configuration of the third embodiment described above, the unallocated period detection unit 22c of the control unit 20c detects a free state period, which is a free state in which signals are not transmitted/received in a time slot, based on the communication unit individual information. The allocation unit 23c of the control unit 20c allocates a communication unit 10 that uses another communication method to the free state period detected by the unallocated period detection unit 22c and allows the transmission/reception of signals. During the free state period, signal collisions and interference are guaranteed to not occur. For this reason, the wireless communication system 50c can use the free state period to transmit and receive signals without collision or interference, thus preventing deterioration of communication characteristics. Also, by using the free state period, the wireless communication system 50c can effectively use the communication band.

Fourth Embodiment

Figure 15:
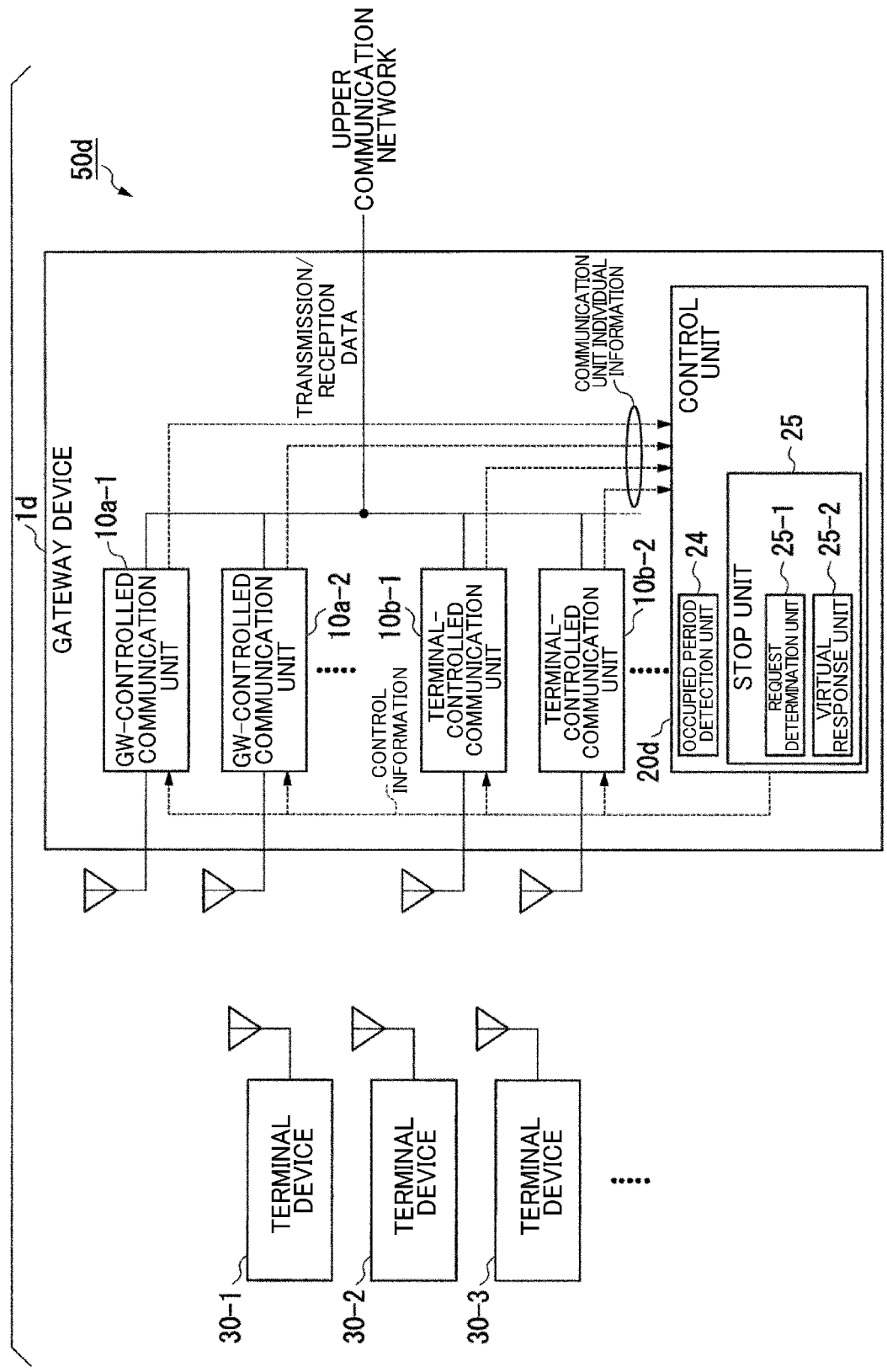
FIG. 15 is a block diagram showing a configuration of a wireless communication system in a fourth embodiment.

FIG. 15 is a block diagram showing the configuration of a wireless communication system 50d according to a fourth embodiment. Configurations that are the same as those of the basic embodiment are designated by the same reference numerals, and different configurations will be described below.

The wireless communication system 50d includes multiple terminal devices 30-1, 30-2, etc., and a gateway device 1d. The gateway device 1d includes multiple GW-controlled communication units 10a, multiple terminal-controlled communication units 10b, and a control unit 20d. The control unit 20d includes an occupied period detection unit 24 and a stop unit 25.

When a communication unit 10 transmits or receives a signal to or from the terminal devices 30-1, 30-2, etc., the occupied period detection unit 24 detects an occupied period that occurs due to the signal. As described in the basic embodiment, the occupied period is, for example, the time from the start to the end of a continuous communication sequence triggered by a beacon signal shown in FIG. 5, that is to say the time from the transmission of the beacon signal (BEAC) to the reception of a response signal (DATA_ACK).

Besides the continuous communication sequence shown in FIG. 5, there is an LPWA communication method that is a communication method having a communication sequence characterized in that packets with the same content are redundantly transmitted multiple times consecutively in order to improve reliability, and responses are given in an extremely short time after transmission. For example, in EnOcean, which is a terminal-controlled communication method, there is a continuous communication sequence having the characteristics shown in FIGS. 16A and 16B in uplink data transmission.

Figure 16A:
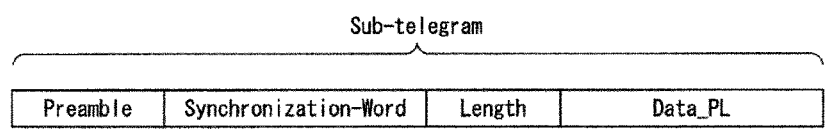
FIG. 16A is a diagram showing the configuration of an EnOcean sub-telegram.
Figure 16B:
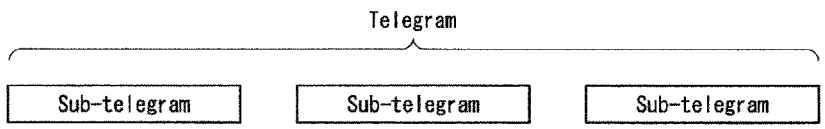
FIG. 16B is a diagram showing the configuration of an EnOcean sub-telegram.

In EnOcean, a sub-telegram in the format shown in FIG. 16A is defined as the minimum unit of communication packets. In EnOcean, it is defined that the same sub-telegram can be sent up to three times in a row. Hereinafter, transmission three times in a row in EnOcean will also be referred to as "triple consecutive transmission". When a sub-telegram is transmitted three times in a row, the combination of these three sub-telegrams is an EnOcean telegram described in the second embodiment (FIG. 16B).

For example, in the case where the interval between sending sub-telegrams is 5 ms, transmission three times will take at least 10 ms, and the occupied period is a time obtained by adding 10 ms to the time required to transmit the last third sub-telegram, that is to say the transmission time for the maximum sub-telegram length.

The stop unit 25 stops the transmission of signals by communication units 10 other than the communication unit 10 corresponding to the occupied period during the occupied period detected by the occupied period detection unit 24.

All LPWA communication methods have a framework for avoiding collisions and interference by monitoring the surrounding radio wave environment before the start of signal transmission, using an operation such as carrier sense (hereinafter referred to as "CS") defined in Radio Law Regulations, such as ARIB T-108, or LBT (Listen Before Talk) defined in the standards of various communication methods.

With CS and LBT in different LPWA communication methods, there are gaps in the middle of the above-mentioned characteristic communication sequence, such as gaps in the triple consecutive transmission of sub-telegrams in EnOcean, and gaps between signals in the consecutive communication sequence shown in FIG. 5. The stop unit 25 stops the transmission of signals by other communication methods during the occupied period detected by the occupied period detection unit 24 so that the time of this gap is not detected as the free time of the wireless channel.

For example, the stop unit 25 switches the CS result acquired by the communication unit 10 from "Idle" to "Busy", which indicates that the wireless channel is in use. As a result, the communication unit 10 deems that the wireless channel is in the blocked state and stops signal transmission.

The stop unit 25 includes a request determination unit 25-1 and a virtual response unit 25-2. The request determination unit 25-1 determines whether or not a wireless channel free state detection request was made by a communication unit 10 that is not transmitting/receiving to/from the terminal devices 30-1, 30-2, etc. in the occupied period detected by the occupied period detection unit 24.

If the request determination unit 25-1 determines that a free state detection request was made, the virtual response unit 25-2 outputs response information that indicates a wireless channel blocked state to the communication unit 10 that made the free state detection request. When the communication unit 10 that made the free state detection request receives the response information indicating the wireless channel blocked state, the communication unit 10 deems that the wireless channel is blocked and stops signal transmission.

(Processing in Control Unit of Fourth Embodiment)

Figure 17:
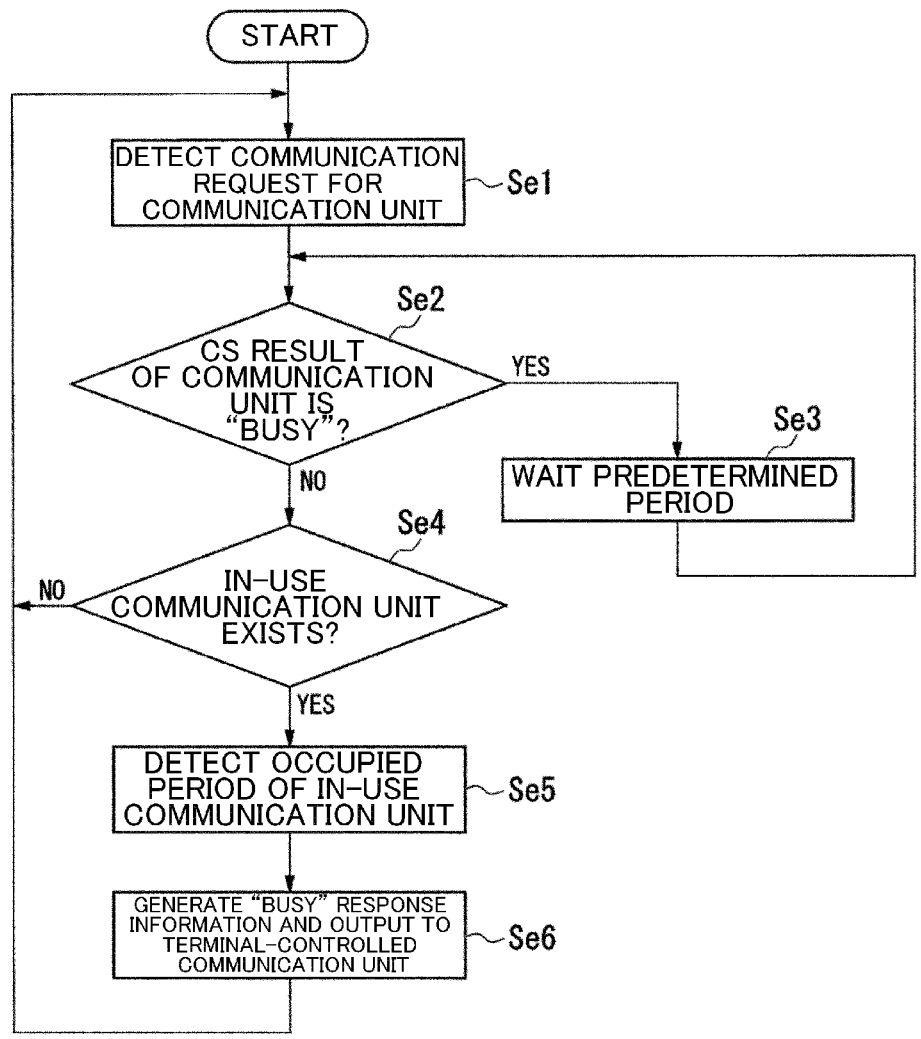
FIG. 17 is a flowchart showing a flow of processing performed by an occupied period detection unit and a stop unit in the fourth embodiment.
Figure 18:
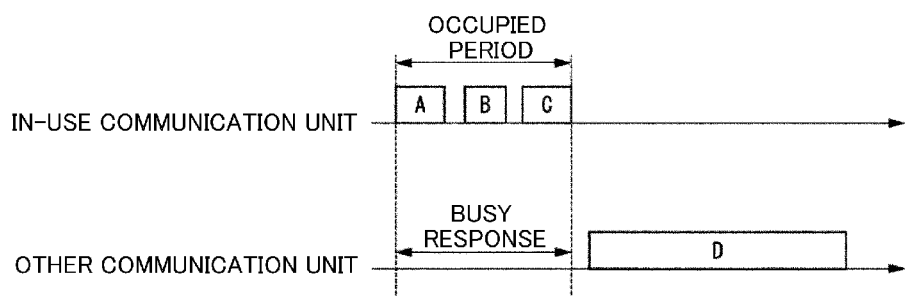
FIG. 18 is a diagram showing processing performed by the occupied period detection unit and the stop unit in the above embodiment.

Next, the flow of processing performed by the occupied period detection unit 24, the request determination unit 25-1, and the virtual response unit 25-2 of the control unit 20d of the fourth embodiment will be described with reference to FIGS. 17 and 18. Before the processing shown in FIG. 17, for example, when the gateway device 1d is started, the control unit 20d acquires the communication unit individual information from all the communication units 10.

Assume here that a communication request for transmitting data is made in any one of the communication units 10. The communication unit 10 in which the communication request was made outputs, to the control unit 20d, notification information that includes information indicating that the communication request was made. The request determination unit 25-1 obtains the notification information that includes information indicating that a communication request was made, and detects that a communication request was made based on the information indicated by the obtained notification information (step Se1).

The communication unit 10 in which the communication request was made performs CS. The communication unit 10 that performed CS outputs, to the control unit 20d, notification information that includes information indicating that CS was performed. The notification information including the information indicating that CS was performed also includes information indicating the CS result. The information indicating the CS result is either "Idle", indicating that the wireless channel is free, or "Busy", indicating that the wireless channel is blocked.

When the CS result is "Idle", the communication unit 10 outputs notification information that includes information indicating that CS was performed, and then temporarily waits for the reception of response information for the notification information from the control unit 20d.

The request determination unit 25-1 obtains the notification information including the information indicating that CS was performed, which was output by the communication unit 10, and reads out the information indicating the CS result included in the obtained notification information. The request determination unit 25-1 determines whether or not the read CS result is "Busy" (step Se2).

In the case of determining that the read CS result is "Busy" (step Se2, Yes), the request determination unit 25-1 waits until a predetermined fixed time elapses (step Se3), and then again performs the processing of step Se2.

On the other hand, in the case of determining that the read CS result is not "Busy", that is to say "Idle" (step Se2, No), the request determination unit 25-1 determines whether or not there is a communication unit 10 that is performing communication, that is to say another communication unit 10 that is transmitting or receiving a signal (step Se4).

If the request determination unit 25-1 determines that another communication unit 10 that is performing communication does not exist (step Se4, No), the virtual response unit 25-2 generates control information indicating permission for data transmission. The virtual response unit 25-2 outputs the generated control information to the communication unit 10 that output the notification information as the response information to the notification information. Thereafter, processing is returned to step Se1. When the communication unit 10 that output the notification information receives the control information indicating permission for data transmission as the response information, the communication unit 10 maintains the CS result "Idle" and starts signal transmission.

On the other hand, if the request determination unit 25-1 determines that another communication unit 10 that is performing communication exists (step Se4, Yes), the occupied period detection unit 24 detects the occupied period occurring due to the other communication unit 10 that is performing communication (step Se5).

For example, if the communication method of the other communication unit 10 that is performing communication is a GW-controlled method, the occupied period detection unit 24 detects, as an occupied period, the time from the start to the end of a continuous communication sequence triggered by the beacon signal shown in FIG. 5. Also, if the communication method of the other communication unit 10 that is performing communication is EnOcean, which is a terminal-controlled method, the occupied period detection unit 24 detects, as the occupied period, the time corresponding to data A, data B, and data C, which are three sub-telegrams as shown in FIG. 18.

The virtual response unit 25-2 generates control information that switches the CS result to Busy. The virtual response unit 25-2 outputs the generated control information as response information to the communication unit 10 that output the notification information (step Se6).

When the communication unit 10 that output the notification information receives the response information for switching the CS result to Busy from the virtual response unit 25-2, the communication unit 10 switches the CS result from "Idle" to "Busy". Accordingly, the communication unit 10 deems that the wireless channel is blocked and stops signal transmission.

If CS is performed again in the occupied period detected by the occupied period detection unit 24 in step Se5 and the CS result is "Idle", the virtual response unit 25-2 repeats the processing of step Se6.

In the configuration of the fourth embodiment described above, if a communication unit 10 transmits or receives a signal to or from the terminal devices 30-1, 30-2, etc., the occupied period detection unit 24 of the control unit 20d detects an occupied period that occurs due to the signal based on the communication unit individual information that corresponds to that communication unit 10. The request determination unit 25-1 of the control unit 20d determines whether or not a wireless channel free state detection request was made, that is to say CS was performed, by a communication unit 10 that is not transmitting or receiving signals to/from the terminal devices 30-1, 30-2, etc. in the occupied period. If the request determination unit 25-1 determines that CS was performed, the virtual response unit 25-2 of the control unit 20d causes the communication unit 10 that performed CS to switch the CS result to "Busy", indicating that the wireless channel is the wireless channel blocked state. Accordingly, even if a communication unit 10 other than the communication unit 10 corresponding to the occupied period performs CS in the occupied period in which signal collision or interference occurs, the virtual response unit 25-2 can cause that communication unit 10 to recognize that the wireless channel is blocked, thus making it possible to stop the transmission of a signal by that communication unit 10. For this reason, the wireless communication system 50d can prevent collisions and interference from occurring during the occupied period and prevent the deterioration of communication characteristics.

Note that in the example described in the fourth embodiment, the virtual response unit 25-2 causes the CS result to be switched, but even in the case of LBT, the configuration of the fourth embodiment can be applied by similarly causing the LBT result to be switched.

Also, in the fourth embodiment described above as well, similarly to the third embodiment, the occupied period detection unit 24 can detect the occupied period based on not only prior information obtained from the communication unit individual information, but also periodicity information and trends and statistical amounts regarding past operating states such as retransmission.

For example, the control unit 20d may be provided with a machine learning function unit and perform machine learning for each communication method based on prior information, periodicity information, and trend and statistical information regarding past operating states. Due to including such a machine learning function unit, the occupied period detection unit 24 may obtain information on the occupied period in the communication method that is the target of the determination by the request determination unit 25-1 from the machine learning function unit.

Also, in the fourth embodiment described above, the virtual response unit 25-2 causes the communication unit 10 of the gateway device 1d to switch the CS result from "Idle" to "Busy" so as to stop the transmission of a downlink signal from the communication unit 10. In contrast, a configuration is possible in which, during the occupied period, in the case of the NAV (Network Allocation Vector) period specified in IEEE 802.11 shown in References 1 and 2 below, an RTS (Request to Send) or a CTS (Clear to Send) frame is transmitted from the communication unit 10 to the terminal devices 30-1, 30-2, etc. so as to stop the transmission of an uplink signal from the terminal devices 30-1, 30-2, etc. during the occupied period.

Reference 1: Masahiro MORIKURA, Shuji KUBOTA, "REV3 802.11 High-speed Wireless LAN Textbook: 4.3 Hidden terminal problem and RTS/CTS solution", Impress R&D, Apr. 11, 2008, pp. 97-99

Reference 2: "Part 11: Wireless LAN Medium Access Control (MAC) and Physical Layer (PHY) Specifications", IEEE standard 802.11-2016, p. 137

Fifth Embodiment

Figure 19:
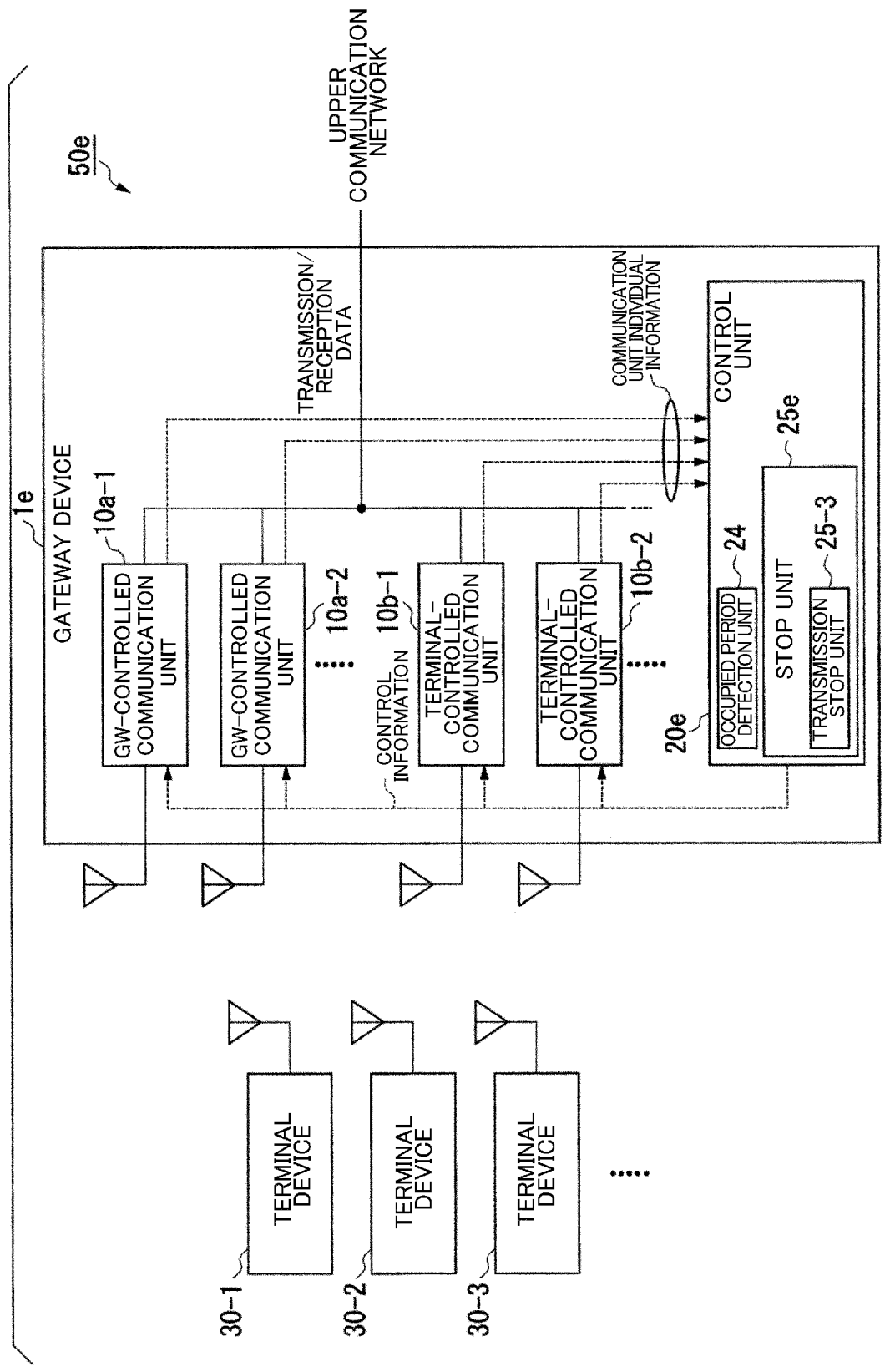
FIG. 19 is a block diagram showing a configuration of a wireless communication system in a fifth embodiment.

FIG. 19 is a block diagram showing the configuration of a wireless communication system 50e according to a fifth embodiment. Configurations that are the same as those of the basic embodiment and the fourth embodiment are designated by the same reference numerals, and different configurations will be described below.

The wireless communication system 50e includes multiple terminal devices 30-1, 30-2, etc., and a gateway device 1e. The gateway device 1e includes multiple GW-controlled communication units 10a, multiple terminal-controlled communication units 10b, and a control unit 20e. The control unit 20e includes an occupied period detection unit 24 and a stop unit 25e.

The stop unit 25e includes a transmission stop unit 25-3. During the occupied period detected by the occupied period detection unit 24, the transmission stop unit 25-3 stops the transmission of a beacon signal to the terminal devices 30-1, 30-2, etc. by a GW-controlled communication unit 10a other than the communication unit 10 that is transmitting or receiving a signal to or from the terminal devices 30-1, 30-2, etc.

(Processing in Control Unit of Fifth Embodiment)

Next, the flow of processing performed by the occupied period detection unit 24 and the transmission stop unit 25-3 of the control unit 20e of the fifth embodiment will be described with reference to FIG. 20.

Figure 20:
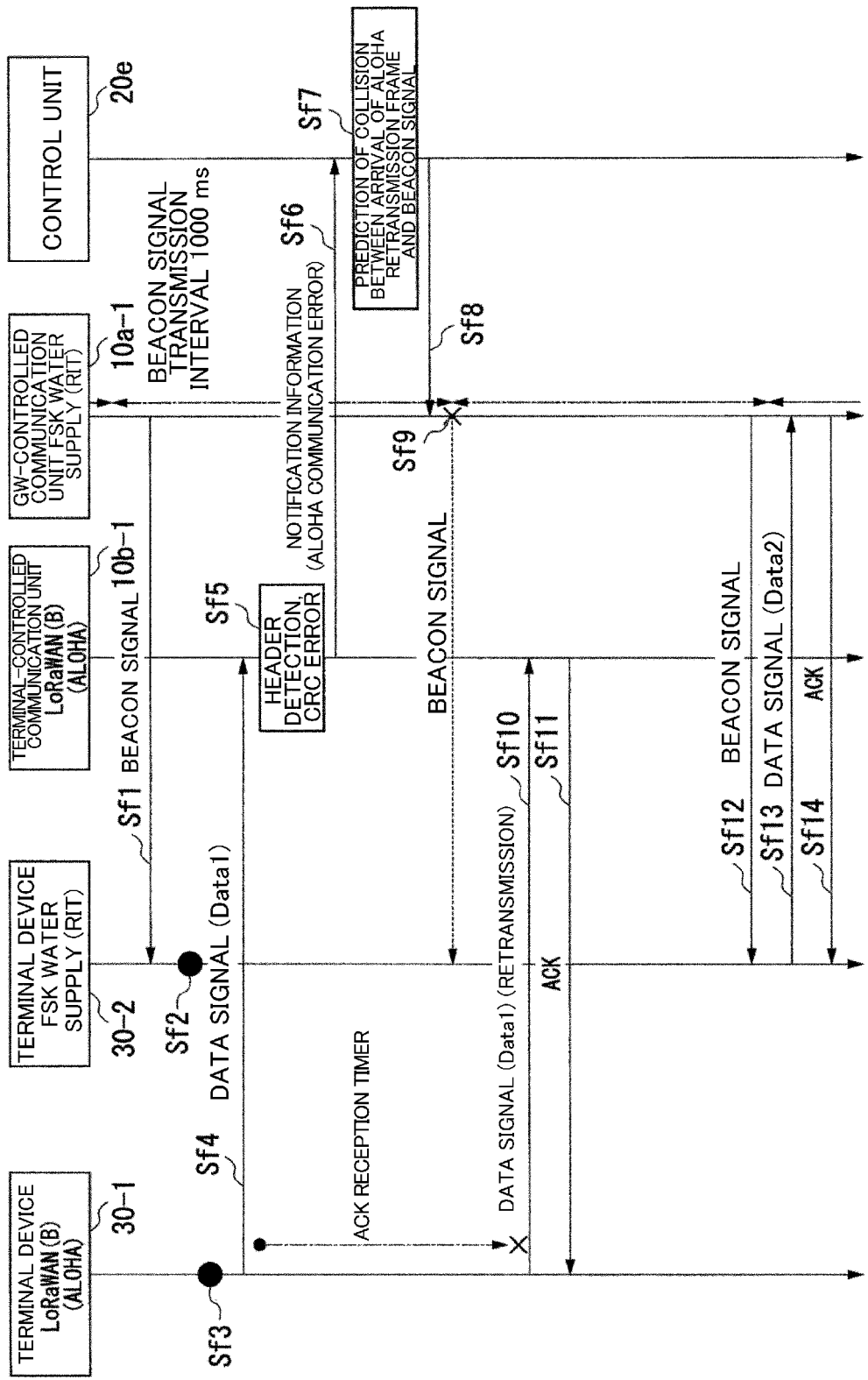
FIG. 20 is a sequence diagram showing a flow of processing performed by the wireless communication system in the above embodiment.

FIG. 20 is a sequence diagram showing uplink data transmission by the ALOHA MAC protocol in a terminal-controlled communication method and uplink data transmission by a GW-controlled communication method. In the ALOHA method, an ACK reception timer is set when data transmission is performed. It is defined that if a response signal for data transmission is not received before the ACK reception timer expires, the data is to be retransmitted. FIG. 20 shows processing for detecting the period up to expiration of the ACK reception timer as an occupied period, and stopping the beacon signal from the gateway device 1e side during the detected occupied period.

FIG. 20 shows the flow of uplink data transmission processing for two combinations, namely the terminal-controlled communication unit 10b-1 and the terminal device 30-1, and the GW-controlled communication unit 10a-1 and the terminal device 30-2. The LoRaWAN (Class-B) communication method is applied as the communication method between the terminal-controlled communication unit 10b-1 and the terminal device 30-1, and the ALOHA method is applied as the MAC protocol.

Also, the FSK water supply communication method is applied as the communication method between the GW-controlled communication unit 10a-1 and the terminal device 30-2, and the RIT method is applied as the MAC protocol.

In the example shown in FIG. 20, 1000 ms has been determined in advance as the beacon transmission interval of the GW-controlled communication unit 10a-1. Before the processing shown in FIG. 20, for example, when the gateway device 1e is started, the control unit 20e acquires the communication unit individual information from the GW-controlled communication unit 10a-1 and the terminal-controlled communication unit 10b-1.

The GW-controlled communication unit 10a-1 transmits the beacon signal to the corresponding terminal device 30-2 at the beacon transmission interval timing (step Sf1). The terminal device 30-2 receives the beacon signal from the GW-controlled communication unit 10a-1, but does not perform data transmission in the uplink direction because a communication request has not been generated. A communication request for transmitting data (Data2) is then generated in the terminal device 30-2 (step Sf2).

A communication request for transmitting data (Data1) is then generated in the terminal device 30-1 (step Sf3). The terminal device 30-1 transmits a data signal that includes data (Data1) to the terminal-controlled communication unit 10b-1 (step Sf4). The terminal device 30-1 sets the ACK reception timer when transmitting the data signal to the terminal-controlled communication unit 10b-1.

The terminal-controlled communication unit 10b-1 receives the data signal from the terminal device 30-1, detects the header of the received data signal, and performs CRC (Cyclic Redundancy Check) based on the detected header. Here, it is assumed that the CRC result is an error (step Sf5).

The terminal-controlled communication unit 10b-1 outputs notification information including ALOHA communication error information to the occupied period detection unit 24 of the control unit 20e (step Sf6).

The occupied period detection unit 24 reads the information regarding the ALOHA system ACK reception timer from the communication unit individual information of the terminal-controlled communication unit 10b-1. ALOHA communication error information also includes the data (Data1) transmission time, and the occupied period detection unit 24 calculates the occupied period based on the transmission time and the information regarding the ACK reception timer, and outputs the calculated occupied period information to the transmission stop unit 25-3.

Based on the occupied period information output by the occupied period detection unit 24 and the communication unit individual information of the GW-controlled communication unit 10a-1, the transmission stop unit 25-3 detects that the transmission time of the beacon signal to be transmitted by the GW-controlled communication unit 10a-1 is in the occupied period (step Sf7). The transmission stop unit 25-3 outputs the beacon signal stop instruction signal to the GW-controlled communication unit 10a-1 (step Sf8).

Upon receiving the beacon signal stop instruction signal, the GW-controlled communication unit 10a-1 skips the beacon signal, that is to say, does not transmit the beacon signal (step Sf9).

When the ACK reception timer expires, the terminal device 30-1 retransmits the data signal that includes the data (Data1) to the terminal-controlled communication unit 10b-1 (step Sf10). The terminal-controlled communication unit 10b-1 receives the data signal from the terminal device 30-1, detects the header of the received data signal, and performs CRC (Cyclic Redundancy Check) based on the detected header. Here, assume that the CRC result is normal.

The terminal-controlled communication unit 10b-1 transmits the data (Data1) included in the received data signal to the upper communication network in accordance with the destination. When data signal reception is complete, the terminal-controlled communication unit 10b-1 transmits a response signal (ACK) to the terminal device 30-1 (step Sf11).

The GW-controlled communication unit 10a-1 transmits the beacon signal to the corresponding terminal device 30-2 at the beacon transmission interval timing (step Sf12). The terminal device 30-2 receives the beacon signal from the GW-controlled communication unit 10a-1 and transmits the data signal that includes the accumulated data (Data2) to the GW-controlled communication unit 10a-1 (step Sf13).

The GW-controlled communication unit 10a-1 receives the data signal from the terminal device 30-2, and transmits the data (Data2) included in the received data signal to the upper communication network in accordance with the destination. When the reception of the data signal is complete, the GW-controlled communication unit 10a-1 transmits a response signal (ACK) to the terminal device 30-2 (step Sf14).

In the configuration of the fifth embodiment described above, when a communication unit 10 transmits or receives a signal to or from the terminal devices 30-1, 30-2, etc., the occupied period detection unit 24 of the control unit 20e detects an occupied period that occurs due to the signal based on the communication unit individual information that corresponds to that communication unit 10. During the occupied period, the transmission stop unit 25-3 of the control unit 20e stops the transmission of a transmission permission signal to the terminal devices 30-1, 30-2, etc. by the GW-controlled communication units 10a other than the communication unit 10 that corresponds to the occupied period.

As a result, as shown in FIG. 20 for example, the GW-controlled communication unit 10a-1 stops the transmission of the beacon signal in the downlink direction in the occupied period detected by the occupied period detection unit 24. For this reason, it is possible to avoid a collision between the uplink data signal that retransmits the data (Data1) by the terminal device 30-1 and the downstream beacon signal. Also, because the beacon signal is not transmitted, the uplink signal transmitted by the terminal device 30-2 can be stopped. For this reason, in the occupied period, it is possible to avoid a collision between the uplink data signal by which data (Data1) is transmitted by the terminal device 30-1 and the uplink signal transmitted by the terminal device 30-2, that is to say, the data signal that includes the data (Data2).

Note that in the configuration of the fifth embodiment described above, the communication method applied to the terminal-controlled communication unit 10b-1 is not limited to being LoRaWAN (Class-B), and any communication method can be used as long as it is a terminal-controlled communication method. Also, a method other than the ALOHA method may be applied as the MAC protocol. Furthermore, the communication method applied to the GW-controlled communication unit 10a-1 is not limited to being FSK water supply, and any communication method may be used as long as it is a GW-controlled communication method. Also, a method other than the RIT method may be applied as the MAC protocol.

Sixth Embodiment

Figure 21:
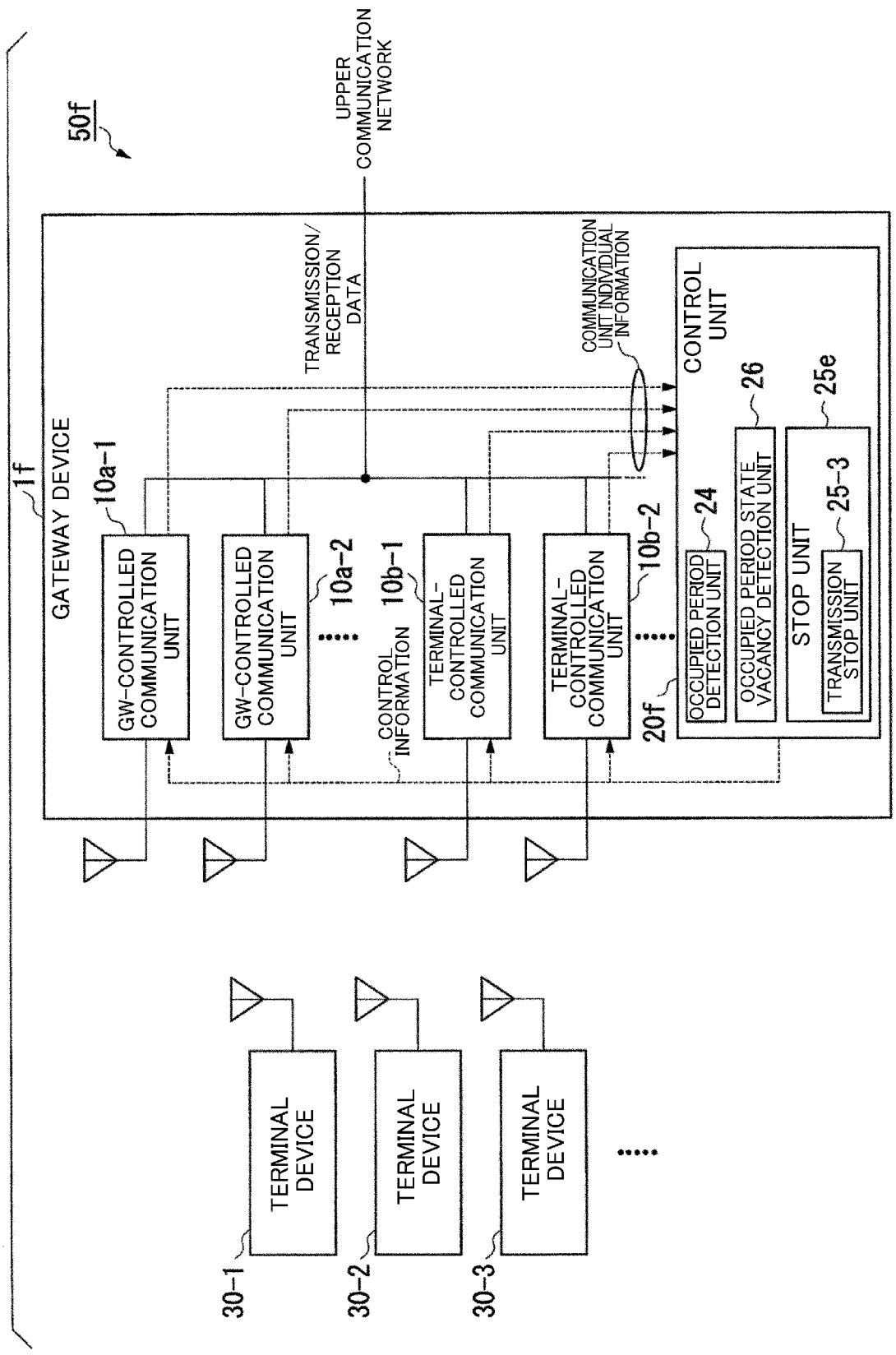
FIG. 21 is a block diagram showing a configuration of a wireless communication system in a sixth embodiment.

FIG. 21 is a block diagram showing the configuration of a wireless communication system 50f according to a sixth embodiment. Configurations that are the same as those of the basic embodiment and the fourth and fifth embodiments are designated by the same reference numerals, and different configurations will be described below.

The wireless communication system 50f includes multiple terminal devices 30-1, 30-2, etc., and a gateway device 1f. The gateway device if includes multiple GW-controlled communication units 10a, multiple terminal-controlled communication units 10b, and a control unit 20f. The control unit 20f includes an occupied period detection unit 24, a stop unit 25e, and an occupied period vacancy detection unit 26.

The occupied period vacancy detection unit 26 detects whether or not the occupied period detected by the occupied period detection unit 24 includes a free state period in which even if a communication unit 10 other than the communication unit 10 that corresponds to the occupied period continues to transmit or receive a signal to or from the terminal devices 30-1, 30-2, etc., that signal will not collide with the signal of the communication unit 10 that corresponds to the occupied period.

(Processing in Control Unit of Sixth Embodiment)

Figure 22:
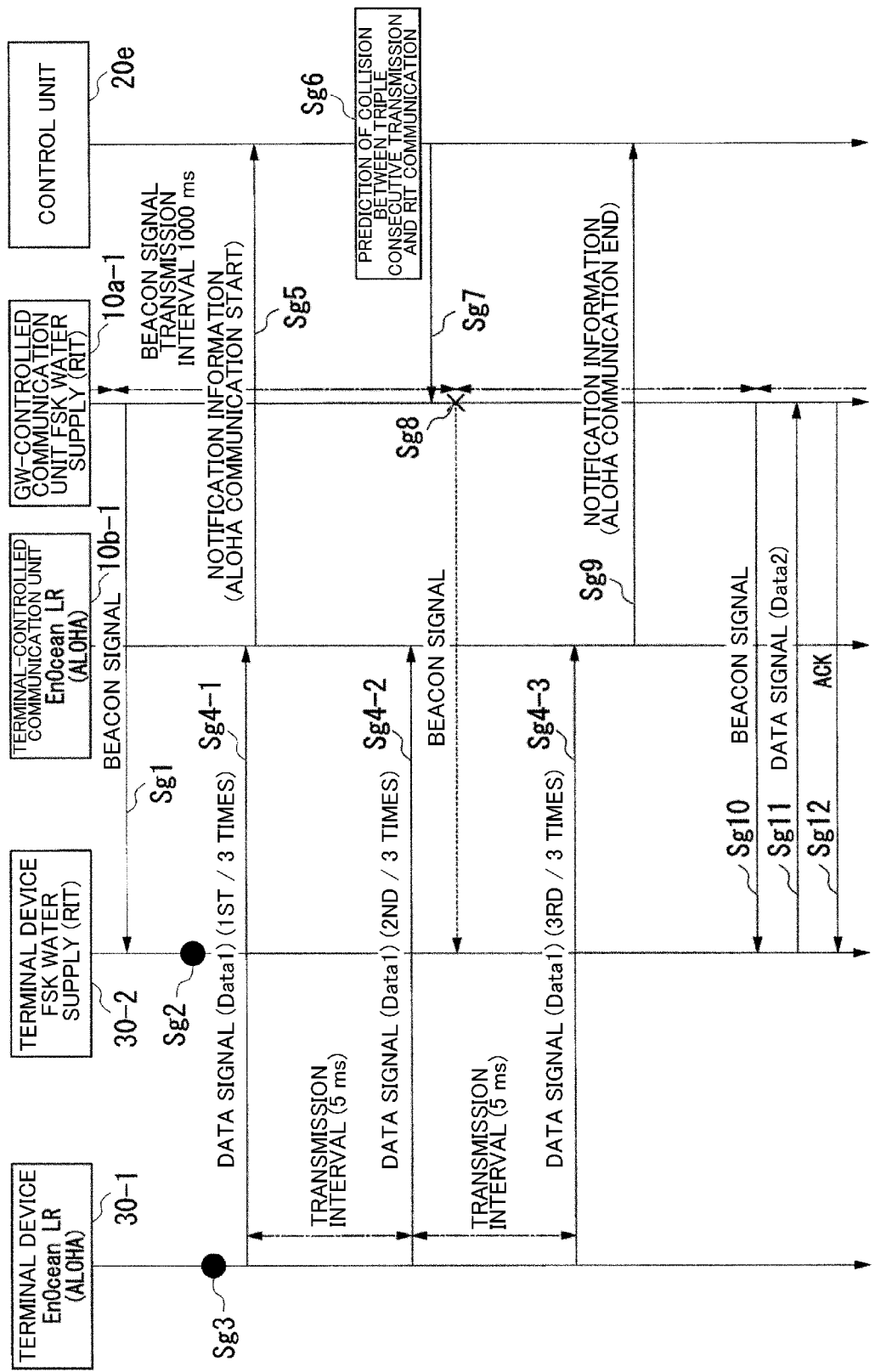
FIG. 22 is a sequence diagram (part 1) showing a flow of processing performed by the wireless communication system in the above embodiment.
Figure 23:
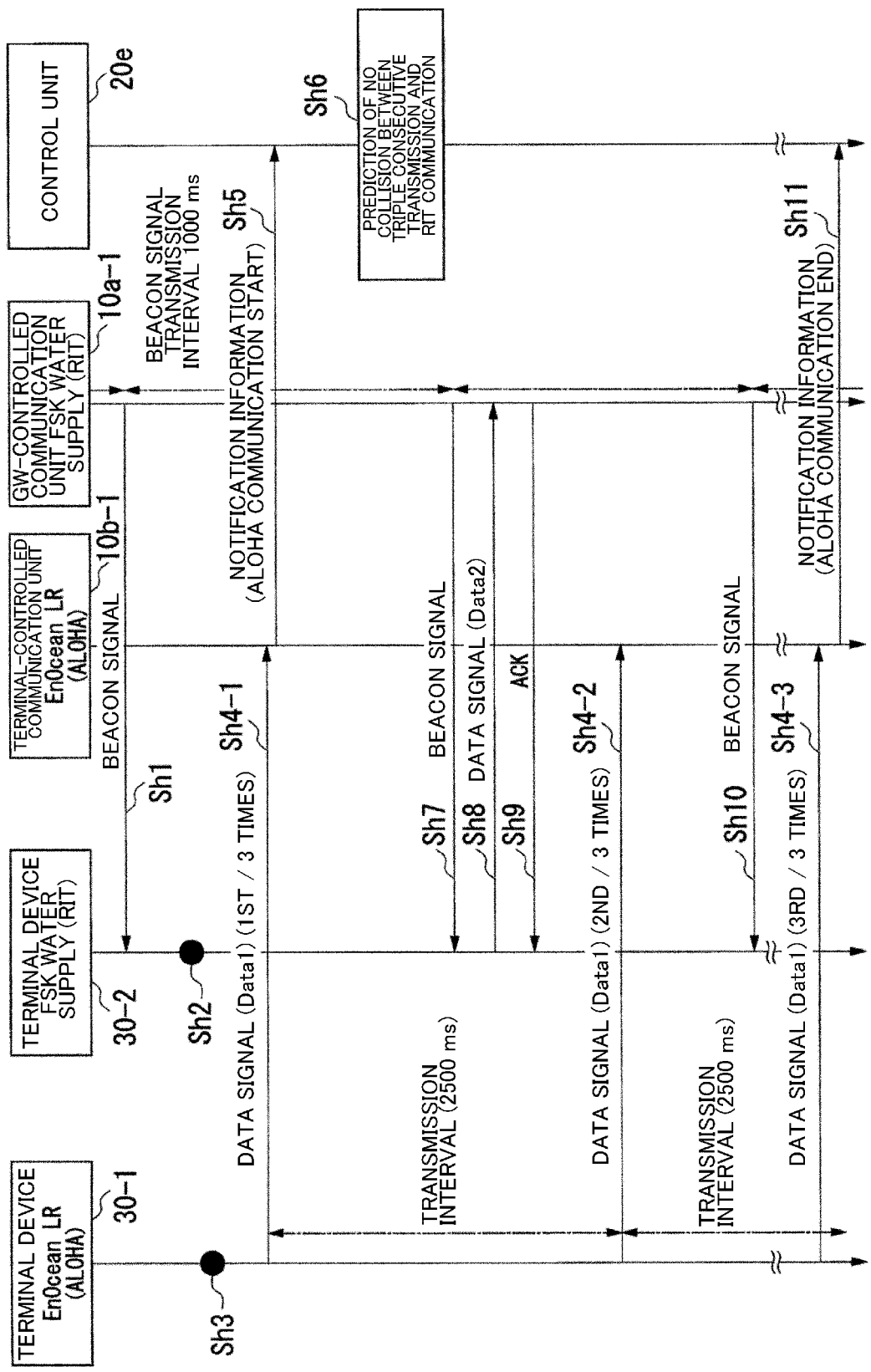
FIG. 23 is a sequence diagram (part 2) showing a flow of processing performed by the wireless communication system in the above embodiment.

FIGS. 22 and 23 are sequence diagrams that show triple consecutive uplink data transmission by EnOcean, which is the terminal-controlled communication method described with reference to FIG. 16B, and uplink data transmission by FSK water supply, which is a GW-controlled communication method. FIG. 22 shows processing in which the transmission of the beacon signal from the gateway device 1e side is stopped during triple consecutive transmission because the transmission interval of triple consecutive transmission is short. In contrast, FIG. 23 shows processing in which, because the transmission interval of triple consecutive transmission is long, the beacon signal is transmitted from the gateway device if side during a free state period between triple consecutive transmissions, and uplink data transmission is performed.

FIGS. 22 and 23 show the flow of processing for uplink data transmission for two combinations, namely the terminal-controlled communication unit 10b-1 and the terminal device 30-1, and the GW-controlled communication unit 10a-1 and the terminal device 30-2.

The EnOcean LR communication method is applied as the communication method between the terminal-controlled communication unit 10b-1 and the terminal device 30-1, and the ALOHA method is applied as the MAC protocol. Also, the FSK water supply communication method is applied as the communication method between the GW-controlled communication unit 10a-1 and the terminal device 30-2, and the RIT method is applied as the MAC protocol.

In the examples shown in FIGS. 22 and 23, the beacon transmission interval of the GW-controlled communication unit 10a-1 has been determined in advance to be 1000 ms. Before the processing shown in FIGS. 22 and 23 is performed, for example, when the gateway device if is started, the control unit 20f obtains the communication unit individual information from the GW-controlled communication unit 10a-1 and the terminal-controlled communication unit 10b-1.

(Processing when Transmission Interval of Triple Consecutive Transmission is Short)

In the example shown in FIG. 22, the transmission interval of uplink data transmission in triple consecutive transmission in EnOcean LR has been determined in advance to be 5 ms.

In FIG. 22, the processing in steps Sg1 and Sg2 is similar to the processing of steps Sf1 and Sf2 shown in FIG. 20.

A communication request for transmitting data (Data1) is then generated in the terminal device 30-1 (step Sg3). The terminal device 30-1 transmits a data signal that includes data (Data1) to the terminal-controlled communication unit 10b-1 as the first transmission of triple consecutive transmission in EnOcean LR (step Sg4-1). The terminal-controlled communication unit 10b-1 receives the first data signal and outputs, to the occupied period detection unit 24 of the control unit 20e, notification information that includes information indicating that ALOHA communication by EnOcean LR has started (step Sg5).

The occupied period detection unit 24 reads out information regarding the transmission interval of triple consecutive transmission in EnOcean LR from the communication unit individual information of the terminal-controlled communication unit 10b-1. The information indicating that ALOHA communication by EnOcean LR has started also includes the data (Data1) transmission time. For this reason, the occupied period detection unit 24 calculates, as the occupied period, the period from the start to the end of triple consecutive transmission based on the transmission time and the information regarding the transmission interval of triple consecutive transmission. The occupied period detection unit 24 outputs the calculated occupied period to the occupied period vacancy detection unit 26.

The occupied period vacancy detection unit 26 reads out the information regarding the transmission interval of triple consecutive transmission in EnOcean LR from the communication unit individual information of the terminal-controlled communication unit 10b-1. The occupied period vacancy detection unit 26 detects whether or not the occupied period includes a free state period in which it is possible to complete the communication sequence of uplink data transmission from the terminal device 30-2, which is started due the GW-controlled communication unit 10a-1 transmitting the beacon signal. The detection of the free state period is performed based on the information regarding the occupied period, the information regarding the transmission interval of triple consecutive transmission in EnOcean LR, and the communication unit individual information of the GW-controlled communication unit 10a-1.

In the example shown in FIG. 22, if the terminal device 30-2 performs data transmission in the uplink direction due to the beacon signal transmitted by the GW-controlled communication unit 10a-1, that data transmission will collide with the third uplink data transmission of triple consecutive transmission. For this reason, the occupied period vacancy detection unit 26 determines that a free state period does not exist (step Sg6). The occupied period vacancy detection unit 26 outputs information indicating that the free state period does not exist to the transmission stop unit 25-3. Because a free state period does not exist, the transmission stop unit 25-3 outputs the beacon signal stop instruction signal to the GW-controlled communication unit 10a-1 (step Sg7).

During steps Sg6 and Sg7, the terminal device 30-1 transmits a data signal that includes data (Data1) to the terminal-controlled communication unit 10b-1 as the second transmission of triple consecutive transmission in EnOcean LR (step Sg4-2). The terminal-controlled communication unit 10b-1 receives the second data signal.

Upon receiving the beacon signal stop instruction signal, the GW-controlled communication unit 10a-1 skips the beacon signal, that is to say, does not transmit the beacon signal (step Sg8).

The terminal device 30-1 transmits a data signal that includes data (Data1) to the terminal-controlled communication unit 10b-1 as the third transmission of triple consecutive transmission in EnOcean LR (step Sg4-3).

The terminal-controlled communication unit 10b-1 receives the third data signal. The gateway device 1 processes the received three consecutive transmission frames and then transfers the data signal to the upper communication network. For example, in EnOcean, the terminal-controlled communication unit 10b-1 of the gateway device 1 selects any one of the three pieces of data (Data1) that is included in the received consecutive transmission frames and does not have a CRC error, and transfers the selected data (Data1) to the upper communication network in accordance with the destination. The terminal-controlled communication unit 10b-1 outputs, to the occupied period detection unit 24 of the control unit 20e, notification information that includes information indicating that ALOHA communication by EnOcean LR has ended (step Sg9).

In steps Sg10 to Sg12, processing similar to that in steps Sf12 to Sf14 shown in FIG. 20 is performed.

(Case where Transmission Interval of Triple Consecutive Transmission is Long)

In the example shown in FIG. 23, the transmission interval of the data transmission in the uplink direction of triple consecutive transmission in EnOcean LR has been determined in advance to be 2500 ms.

In FIG. 23, the processing of steps Sh1 to Shy is similar to that of steps Sg1 to Sg5 shown in FIG. 22.

In step Sh6, the occupied period detection unit 24 detects a free state period in the occupied period, as in step Sg6 shown in FIG. 22.

In the example shown in FIG. 23, even if the terminal device 30-2 performs data transmission in the uplink direction due to the beacon signal transmitted by the GW-controlled communication unit 10a-1, the communication sequence of that data transmission ends between the first and second transmissions of triple consecutive transmission, and no collision occurs. For this reason, the occupied period vacancy detection unit 26 detects a free state period in the occupied period (step Sh6). The occupied period vacancy detection unit 26 outputs information indicating the detected free state period to the transmission stop unit 25-3. The transmission stop unit 25-3 receives the information indicating the free state period and does not output the beacon signal stop instruction signal.

In steps Sh7 to Sh9, processing similar to that in steps Sg10 to Sg12 shown in FIG. 22 is performed.

The terminal device 30-1 transmits a data signal that includes data (Data1) to the terminal-controlled communication unit 10b-1 as the second transmission of triple consecutive transmission in EnOcean LR (step Sh4-2). The terminal-controlled communication unit 10b-1 receives the second data signal.

The GW-controlled communication unit 10a-1 transmits the beacon signal to the corresponding terminal device 30-2 at the beacon transmission interval timing (step Sh10). The terminal device 30-2 receives the beacon signal from the GW-controlled communication unit 10a-1, but does not perform data transmission in the uplink direction because a communication request has not been generated.

In steps Sh4-3 and Sh11, processing similar to that in steps Sg4-3 and Sg9 shown in FIG. 22 is performed.

In the configuration of the sixth embodiment described above, if a communication unit 10 transmits or receives a signal to or from the terminal devices 30-1, 30-2, etc., the occupied period detection unit 24 of the control unit 20f detects an occupied period that occurs due to the signal based on the communication unit individual information that corresponds to that communication unit 10. The occupied period vacancy detection unit 26 detects whether or not the occupied period detected by the occupied period detection unit 24 includes a free state period in which even if a communication unit 10 other than the communication unit 10 that corresponds to the occupied period continues to transmit or receive a signal to or from the terminal devices 30-1, 30-2, etc., that signal will not collide with the signal of the communication unit 10 that corresponds to the occupied period. If the occupied period vacancy detection unit 26 detects a free state period, the transmission stop unit 25-3 does not stop the transmission of the beacon signal by the communication units 10 other than the communication unit 10 that corresponds to the occupied period. On the other hand, if the occupied period vacancy detection unit 26 does not detect a free state period, the transmission stop unit 25-3 stops the transmission of the beacon signal by the communication unit 10 other than the communication unit 10 that corresponds to the occupied period.

Accordingly, for example, as shown in FIG. 22, if the transmission interval of triple consecutive transmission is short, the GW-controlled communication unit 10*a*-1 stops the beacon signal transmitted in the downlink direction in the occupied period. For this reason, it is possible to avoid a collision between an uplink data signal that includes the third data (Data1) transmitted by the terminal device 30-1 and the beacon signal in the downstream direction. Also, since the beacon signal is not transmitted, the transmission of an uplink signal by the terminal device 30-2 can be stopped. For this reason, in the occupied period, it is possible to avoid a collision between an uplink data signal that includes the third data (Data1) transmitted by the terminal device 30-1 and an uplink signal transmitted by the terminal device 30-2, that is to say a data signal that includes data (Data2).

On the other hand, as shown in FIG. 23, if the transmission interval of triple consecutive transmission is long, even in the occupied period, if the communication sequence for the uplink transmission of data including data (Data2) by the terminal device 30-2 ends within the transmission interval of triple consecutive transmission, the GW-controlled communication unit 10*a*-1 does not stop the beacon signal, and therefore efficient data transmission can be performed.

In the configuration of the sixth embodiment described above, if the occupied period is regarded as a time frame allocated to one communication method, it can be thought that the occupied period vacancy detection unit 26 detects a free state in the time frame. Considering this, it can be interpreted that the occupied period vacancy detection unit 26 and the unallocated period detection unit 22*c* of the third embodiment perform the same processing. It can also be thought that the configuration in which the transmission stop unit 25-3 does not stop the transmission of the beacon signal if there is a free state period is processing for allocating another communication method in which signal transmission/reception has already been performed, that is to say the GW-controlled communication unit 10*a*-1, to the free state period in the occupied period. The allocation unit 23*c* of the third embodiment is configured to allocate another communication method that has not performed signal transmission/reception to the free state period. For this reason, if the configuration of allocating another communication method that has already performed signal transmission/reception is added to the configuration of the allocation unit 23*c*, it can be thought that the allocation unit 23*c* includes a configuration that is in common with the transmission stop unit 25-3.

Also, in the sixth embodiment described above, the communication method applied to the terminal-controlled communication unit 10*b*-1 is not limited to being EnOcean LR, and may be a terminal-controlled method having a characteristic communication sequence such as triple consecutive transmission in EnOcean LR. Also, a method other than the ALOHA method may be applied as the MAC protocol. Furthermore, the communication method applied to the GW-controlled communication unit 10*a*-1 is not limited to being FSK water supply, and any communication method may be used as long as it is a GW-controlled communication method. Also, a method other than the RIT method may be applied as the MAC protocol.

Furthermore, in the sixth embodiment described above, transmission is performed three times consecutively in EnOcean LR, but the number of consecutive transmissions is not limited to being three. For example, in EnOcean, the same telegram is transmitted up to two times in the network layer as described above, and therefore there are cases where a sub-telegram is transmitted up to six times. For this reason, any number of transmissions from two to six is determined before operation.

Also, in the fifth and sixth embodiments described above, the transmission stop unit 25-3 stops the transmission of the beacon signal by the GW-controlled communication unit 10*a*-1, but the configuration of the present invention is not limited to this aspect. For example, a configuration is possible in which, regardless of the communication methods of the GW-controlled communication unit 10*a* and the terminal-controlled communication unit 10*b*, if data to be transmitted in the downlink direction (i.e., to the terminal devices 30-1, 30-2, etc.) is stored, the transmission of the stored data may be stopped by the transmission stop unit 25-3. As a result, it is possible to avoid a collision with data transmission in the uplink direction from the terminal devices 30-1, 30-2, etc.

Also, in the fifth and sixth embodiments described above, in the terminal-controlled communication method used by the terminal-controlled communication unit 10*b*-1, an occupied period is detected based on the characteristic uplink signal communication sequence, but the configuration of the present invention is not limited to this aspect. For example, the terminal-controlled communication unit 10*b*-1 may be replaced with the GW-controlled communication unit 10*a*-1, and the occupied period may be detected based on the communication sequence that occurs due to the beacon signal transmitted by the GW-controlled communication unit 10*a*-1.

Also, the stopping of transmission by the transmission stop unit 25-3 in the fifth and sixth embodiments may be realized by, for example, the following configuration. For example, envision the case where there are four communication methods, namely wide area seven, LoRa seven, EnOcean, and LoRaWAN (Class-A). In this case, one wireless chip is equipped with wide area seven and LoRa seven, which are GW-controlled methods, and signal transmission and signal reception are performed at different times during normal operation. Regarding the terminal-controlled methods, assume that EnOcean and LoRaWAN (Class-A) are each provided in a different wireless chip, and a total of three wireless chips constitute one communication unit 10. This makes it possible to obtain more wireless chips than the number of physical chips. In the communication unit 10, during normal operation, EnOcean and LoRaWAN (Class-A) are placed in a reception standby state. When one of the communication methods is started, the other communication method is stopped.

(Applicable Scopes of Configurations of First to Sixth Embodiments)

Figures 24, 25:
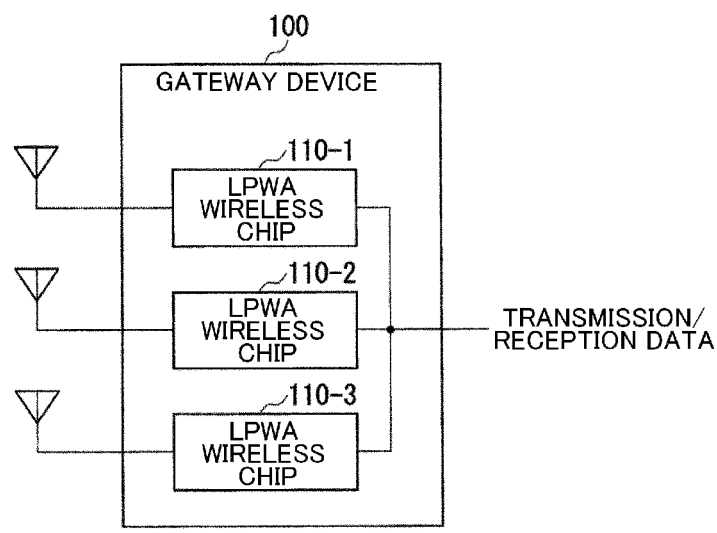
FIG. 24 is a diagram showing a table that organizes applicable scopes of the first to sixth embodiments.
FIG. 25 is a block diagram showing a configuration of a conventional gateway device.
Figure 26A:
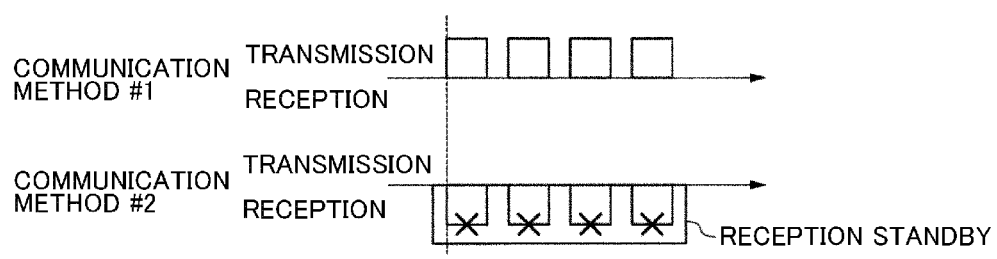
FIG. 26A is a diagram showing an example of signal collision and interference that occur in a conventional gateway device.
Figure 26B:
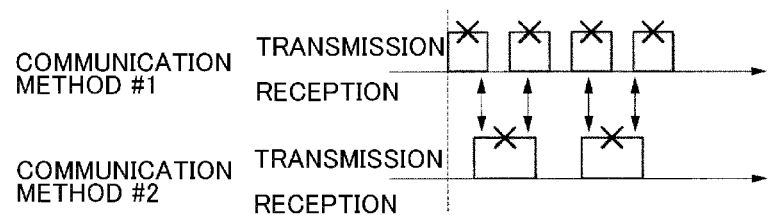
FIG. 26B is a diagram showing an example of signal collision and interference that occur in a conventional gateway device.

FIG. 24 is a diagram showing a table that organizes applicable scopes of the configurations of the first to sixth embodiments. In the configuration of the first embodiment, in order to avoid the overlapping of the timings of data transmission in the uplink direction by adjusting the transmission timing of the beacon signal of a GW-controlled method, all of the communication methods need to be a GW-controlled method, and this is not applicable to configurations that include terminal-controlled methods. The configurations of the second and third embodiments can be applied to any of the three items shown in FIG. 24.

The fourth to sixth embodiments are also applicable to any of the three items shown in FIG. 24. However, if there is a combination of terminal-controlled methods, the aforementioned embodiments can be applied if one of the terminal-controlled methods enables the detection of the occupied period, but the stopping of signal transmission for a terminal-controlled method is only applicable to data transmission in the downlink direction, and data transmission in the uplink direction cannot be stopped.

Also, in the fifth and sixth embodiments described above, the specific examples pertain to the flow of processing for data transmission in the uplink direction for two combinations, namely a combination of the terminal-controlled communication unit 10b-1 and the terminal device 30-1, and a combination of the GW-controlled communication unit 10a-1 and the terminal device 30-2. In terms of applicability for combinations other than these combinations, for the combination of "GW-controlled method+GW-controlled method" shown in FIG. 24, given that the beacon signal can be stopped in a GW-controlled method, application to three or more GW-controlled methods is possible. For the same reason, for the combination of "terminal-controlled method with characteristic communication sequence+GW-controlled method", application to a combination of one terminal-controlled method with a characteristic communication sequence and multiple GW-controlled methods is also possible. On the other hand, in the case of multiple terminal-controlled methods, even if there is another GW-controlled method, the conditions are the same as those for "terminal-controlled method with characteristic communication sequence+terminal-controlled method", and therefore application is only possible for data transmission in the downlink direction.

Note that if RTS/CTS described in the fourth embodiment is used to stop uplink data transmission from the terminal devices 30-1, 30-2, etc., application is also possible for a combination of a terminal-controlled method with a characteristic communication sequence and any arbitrary terminal-controlled method in the fourth to sixth embodiments, which is shown by a circle.

The control units 20, 20a, 20b, 20c, 20d, 20e, and 20f in the above-described embodiments may each be a standalone control device and be respectively provided inside the gateway devices 1, 1a, 1b, 1c, 1d, 1e, and 1f. The control device may be realized by a computer and a program, and the program may be recorded on a recording medium or provided through a network. In other words, a program for realizing such functionality may be recorded on a computer-readable recording medium, and the program recorded on the recording medium may be read into a computer system and executed for realization. Note that the term "computer system" as used herein includes an OS and hardware such as peripheral devices. Also, "computer-readable recording medium" refers to a portable medium such as a flexible disk, a magneto-optical disk, a ROM, or a CD-ROM, or a storage device such as a hard disk built in a computer system. Also, a "computer-readable recording medium" may dynamically hold the program for a short period of time, such as in the case of a communication line for transmitting a program via a network such as the Internet or a communication line such as a telephone line, or may hold the program for a certain period of time, such as in the case of a volatile memory inside a computer system that serves as a server or a client in the aforementioned. Also, the above program may be for realizing a portion of the above-mentioned functions, may be for realizing the above-mentioned functions in combination with a program already recorded in the computer system, or may be realized by using a programmable logic device such as FPGA (Field Programmable Gate Array).

Although embodiments of the present invention have been described in detail with reference to the drawings, the specific configuration is not limited to these embodiments, and the present invention also includes designs and the like within a range that does not depart from the gist of the invention.

REFERENCE SIGNS LIST

1 Gateway device
10a-1, 10a-2 GW-controlled communication unit
10b-1, 10b-2 Terminal-controlled communication unit
20 Control unit
30-1, 30-2 Terminal device
50 Wireless communication system

The invention claimed is:

1. A control device for provision in a gateway device, comprising:
a plurality of communication units, each including one or more processors, configured to perform wireless communication with a terminal device using different communication methods,
wherein based on communication unit individual information that is acquired from the communication units and includes information indicating at least a characteristic of the communication method of each of the communication units, operations of the communication units are scheduled so as to prevent overlapping of periods in which the communication units perform signal transmission/reception with the terminal device;
an occupied period detection unit, including one or more processors, configured to, in a case where one of the communication units performs signal transmission/reception with the terminal device, detect an occupied period that occurs due to the signal transmission/reception, based on the communication unit individual information that corresponds to the one communication unit; and
a stop unit, including one or more processors, configured to:
during the occupied period detected by the occupied period detection unit, stop signal transmission performed by a communication unit other than the communication unit that corresponds to the occupied period,
determine whether or not a free state detection request regarding a wireless channel was made by a communication unit that is not performing signal transmission/reception with the terminal device in the occupied period, and in response to determining that the free state detection request was made, transmit a response indicating that the wireless channel is in a blocked state to the communication unit that made the free state detection request.

2. The control device according to claim 1,
wherein each of the communication units is a gateway-controlled communication unit according to which the terminal device starts transmission of a data signal in response to reception of a transmission permission signal transmitted by the communication unit, and
the control device comprises a transmission timing adjustment unit, including one or more processors, configured to, based on the communication unit individual information, adjust timings of transmission of the transmission permission signal by the gateway-controlled communication units so as to prevent overlapping of periods in which the gateway-controlled communication units perform signal transmission/reception with the terminal device.

3. The control device according to claim 1, comprising:
an unallocated period detection unit, including one or more processors, configured to detect, based on the communication unit individual information, an unallocated period in which none of the communication units perform signal transmission/reception; and
an allocation unit, including one or more processors, configured to allocate any one of the communication units to the unallocated period detected by the unallocated period detection unit to allow the one communication unit to perform signal transmission/reception.

4. The control device according to claim 3,
wherein, based on the communication unit individual information, the unallocated period detection unit is configured to detect a stop period in which all of the communication units have stopped signal transmission/reception as the unallocated period, and
the allocation unit is configured to allocate any one of the communication units to the stop period detected by the unallocated period detection unit to allow the one communication unit to perform signal transmission/reception.

5. The control device according to claim 3,
wherein in a case where signal transmission/reception is performed by any one of the communication methods that was allocated to a time frame,
based on the communication unit individual information, the unallocated period detection unit is configured to detect a free state period as the unallocated period, the free state period being a free state in which the signal transmission/reception is not performed in the time frame, and
the allocation unit is configured to allocate a communication unit corresponding to another communication method to the free state period detected by the unallocated period detection unit to allow the communication unit corresponding to another communication method to perform signal transmission/reception.

6. The control device according to claim 1,
wherein at least one of the communication units is a gateway-controlled communication unit according to which the terminal device starts transmission of a data signal in response to reception of a transmission permission signal transmitted by the communication unit, and another communication unit that is different from the gateway-controlled communication unit is a terminal-controlled communication unit according to which the terminal device performs data signal transmission at an arbitrary timing, and
the stop unit includes a transmission stop unit, including one or more processors, configured to, during the occupied period, stop transmission of the transmission permission signal to the terminal device by a gateway-controlled communication unit that is different from the communication unit that corresponds to the occupied period, or stop data signal transmission to the terminal device by a communication unit different from the communication unit that corresponds to the occupied period.

7. A control method for controlling a plurality of communication units included in a gateway device, the plurality of communication units being configured to perform wireless communication with a terminal device using different communication methods, the control method comprising:
scheduling, based on communication unit individual information that is acquired from the communication units and includes information indicating at least a characteristic of the communication method of each of the communication units, operations of the communication units so as to prevent overlapping of periods in which the communication units perform signal transmission/reception with the terminal device;
in a case where one of the communication units performs signal transmission/reception with the terminal device, detecting an occupied period that occurs due to the signal transmission/reception, based on the communication unit individual information that corresponds to the one communication unit;
during the occupied period, stopping signal transmission performed by a communication unit other than the communication unit that corresponds to the occupied period;
determining whether or not a free state detection request regarding a wireless channel was made by a communication unit that is not performing signal transmission/reception with the terminal device in the occupied period; and
in response to determining that the free state detection request was made, transmitting a response indicating that the wireless channel is in a blocked state to the communication unit that made the free state detection request.

8. The control method according to claim 7, wherein:
each of the communication units is a gateway-controlled communication unit according to which the terminal device starts transmission of a data signal in response to reception of a transmission permission signal transmitted by the communication unit, and
the control method comprises:
based on the communication unit individual information, adjusting timings of transmission of the transmission permission signal by the gateway-controlled communication units so as to prevent overlapping of periods in which the gateway-controlled communication units perform signal transmission/reception with the terminal device.

9. The control method according to claim 7, comprising:
detecting, based on the communication unit individual information, an unallocated period in which none of the communication units perform signal transmission/reception; and allocating any one of the communication units to the unallocated period to allow the one communication unit to perform signal transmission/reception.

10. The control method according to claim 9, comprising:
detecting a stop period in which all of the communication units have stopped signal transmission/reception as the unallocated period; and
allocating any one of the communication units to the stop period to allow the one communication unit to perform signal transmission/reception.

11. The control method according to claim 9, comprising:
in a case where signal transmission/reception is performed by any one of the communication methods that was allocated to a time frame,
based on the communication unit individual information, detecting a free state period as the unallocated period, the free state period being a free state in which the signal transmission/reception is not performed in the time frame; and
allocating a communication unit corresponding to another communication method to the free state period to allow the communication unit corresponding to another communication method to perform signal transmission/reception.

12. The control method according to claim 7, wherein:
at least one of the communication units is a gateway-controlled communication unit according to which the terminal device starts transmission of a data signal in response to reception of a transmission permission signal transmitted by the communication unit, and another communication unit that is different from the gateway-controlled communication unit is a terminal-controlled communication unit according to which the terminal device performs data signal transmission at an arbitrary timing, and
the control method comprises:
during the occupied period, stopping transmission of the transmission permission signal to the terminal device by a gateway-controlled communication unit that is different from the communication unit that corresponds to the occupied period, or stopping data signal transmission to the terminal device by a communication unit different from the communication unit that corresponds to the occupied period.

13. A non-transitory computer readable medium storing one or more instructions causing a computer to function as a control device for provision in a gateway device that includes a plurality of communication units that perform wireless communication with a terminal device using different communication methods, the one or more instructions causing the computer to execute:
scheduling, based on communication unit individual information that is acquired from the communication units and includes information indicating at least a characteristic of the communication method of each of the communication units, operations of the communication units so as to prevent overlapping of periods in which the communication units perform signal transmission/reception with the terminal device;
in a case where one of the communication units performs signal transmission/reception with the terminal device, detecting an occupied period that occurs due to the signal transmission/reception, based on the communication unit individual information that corresponds to the one communication unit;
during the occupied period, stopping signal transmission performed by a communication unit other than the communication unit that corresponds to the occupied period;
determining whether or not a free state detection request regarding a wireless channel was made by a communication unit that is not performing signal transmission/reception with the terminal device in the occupied period; and
in response to determining that the free state detection request was made, transmitting a response indicating that the wireless channel is in a blocked state to the communication unit that made the free state detection request.

14. The non-transitory computer readable medium according to claim 13, wherein
each of the communication units is a gateway-controlled communication unit according to which the terminal device starts transmission of a data signal in response to reception of a transmission permission signal transmitted by the communication unit, and
the one or more instructions cause the computer to execute:
based on the communication unit individual information, adjusting timings of transmission of the transmission permission signal by the gateway-controlled communication units so as to prevent overlapping of periods in which the gateway-controlled communication units perform signal transmission/reception with the terminal device.

15. The non-transitory computer readable medium according to claim 13, wherein the one or more instructions cause the computer to execute:
detecting, based on the communication unit individual information, an unallocated period in which none of the communication units perform signal transmission/reception; and
allocating any one of the communication units to the unallocated period to allow the one communication unit to perform signal transmission/reception.

16. The non-transitory computer readable medium according to claim 15, wherein the one or more instructions cause the computer to execute:
detecting a stop period in which all of the communication units have stopped signal transmission/reception as the unallocated period; and
allocating any one of the communication units to the stop period to allow the one communication unit to perform signal transmission/reception.

* * * * *